United States Patent
Luzzato et al.

(10) Patent No.: US 11,535,551 B2
(45) Date of Patent: Dec. 27, 2022

(54) THERMOFORMED COVER GLASS FOR AN ELECTRONIC DEVICE

(71) Applicant: Apple Inc., Cupertino, CA (US)

(72) Inventors: Victor Luzzato, Cupertino, CA (US); Dale N. Memering, San Francisco, CA (US); Christopher C. Bartlow, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 543 days.

(21) Appl. No.: 15/676,860

(22) Filed: Aug. 14, 2017

(65) Prior Publication Data
US 2018/0086663 A1    Mar. 29, 2018

Related U.S. Application Data

(60) Provisional application No. 62/398,611, filed on Sep. 23, 2016, provisional application No. 62/398,627, (Continued)

(51) Int. Cl.
*B32B 17/06* (2006.01)
*C03C 15/02* (2006.01)
(Continued)

(52) U.S. Cl.
CPC ............ *C03C 15/02* (2013.01); *B32B 17/06* (2013.01); *B32B 17/10036* (2013.01);
(Continued)

(58) Field of Classification Search
CPC ............ B32B 17/10036; B32B 17/06; B32B 2307/584; B32B 2307/536;
(Continued)

(56) References Cited

U.S. PATENT DOCUMENTS 2,795,084 A * 6/1957 Littleton ............. C03C 17/23
65/24
3,410,673 A   11/1968 Marusak
(Continued)

FOREIGN PATENT DOCUMENTS

CN   101475300   7/2009
CN   103986803   8/2013
(Continued)

OTHER PUBLICATIONS

Eric Le Bourhis, Glass Mechanics and Technology. 2007 WILEY-VCH Verlag GmbH & KGaA, Weinheim Apendix 3: Thermal Expansion and Elasticity (Year: 2007).*
(Continued)

*Primary Examiner* — Jodi C Franklin
(74) *Attorney, Agent, or Firm* — Brownstein Hyatt Farber Schreck, LLP

(57) ABSTRACT

A property-enhanced cover sheet, and methods for forming a property-enhanced cover sheet, for a portable electronic device are disclosed. A property-enhanced cover sheet is formed by thermoforming a glass sheet into a specified contour shape while modifying one or more properties of the glass. Other property-enhanced sheets can be formed by layering two or more glass sheets having different material properties, and then thermoforming the layered sheets into a required contour shape. Property enhancement for a cover sheet includes, hardness, scratch resistance, strength, elasticity, texture and the like.

20 Claims, 20 Drawing Sheets

Related U.S. Application Data filed on Sep. 23, 2016, provisional application No. 62/398,616, filed on Sep. 23, 2016.

(51) Int. Cl.

| | | |
|---|---|---|
| *C03C 15/00* | (2006.01) | |
| *C03C 27/06* | (2006.01) | |
| *C03B 23/03* | (2006.01) | |
| *C03B 23/203* | (2006.01) | |
| *C03C 17/00* | (2006.01) | |
| *B32B 17/10* | (2006.01) | |
| *C03C 19/00* | (2006.01) | |
| *C03C 21/00* | (2006.01) | |

(52) U.S. Cl.
CPC .......... *C03B 23/03* (2013.01); *C03B 23/0302* (2013.01); *C03B 23/0305* (2013.01); *C03B 23/203* (2013.01); *C03C 15/00* (2013.01); *C03C 17/007* (2013.01); *C03C 19/00* (2013.01); *C03C 21/002* (2013.01); *C03C 27/06* (2013.01); *B32B 2307/536* (2013.01); *B32B 2307/584* (2013.01); *C03C 2217/42* (2013.01); *C03C 2217/452* (2013.01); *C03C 2217/475* (2013.01); *C03C 2217/76* (2013.01); *C03C 2217/77* (2013.01); *C03C 2217/78* (2013.01)

(58) Field of Classification Search
CPC ............ C03C 2217/42; C03C 2217/78; C03C 2217/76; C03C 2217/452; C03C 2217/77; C03C 27/06; C03C 21/002; C03C 19/00; C03C 17/007; C03C 15/00; C03B 23/203; C03B 23/0305; C03B 23/03; C03B 23/03
See application file for complete search history.

(56) References Cited

U.S. PATENT DOCUMENTS

| | | | |
|---|---|---|---|
| 3,433,611 A | 3/1969 | Kubican | |
| 3,464,880 A | 9/1969 | Rinehart | |
| 3,737,294 A | 6/1973 | Dumbaugh, Jr. et al. | |
| 3,746,526 A | 7/1973 | Giffon | |
| 3,899,315 A * | 8/1975 | Siegmund | C03B 17/02 |
| | | | 65/23 |
| 4,054,895 A | 10/1977 | Ham et al. | |
| 4,070,211 A | 1/1978 | Haran et al. | |
| 4,209,229 A | 6/1980 | Rittler | |
| 4,339,300 A | 7/1982 | Noble et al. | |
| 4,735,917 A | 4/1988 | Flatley et al. | |
| 4,849,299 A | 7/1989 | Loth et al. | |
| 5,122,177 A | 6/1992 | Yoshizama et al. | |
| 5,173,453 A | 12/1992 | Beall et al. | |
| 5,273,553 A | 12/1993 | Hoshi et al. | |
| 6,055,053 A | 4/2000 | Lesniak | |
| 6,067,005 A | 5/2000 | DeVolpi | |
| 6,169,256 B1 | 1/2001 | Hanahara | |
| 6,406,769 B1 | 6/2002 | Delabre et al. | |
| 6,809,278 B2 | 10/2004 | Tsubaki | |
| 6,928,224 B2 | 8/2005 | Beall et al. | |
| 7,115,827 B2 | 10/2006 | Tseng | |
| 7,240,519 B2 * | 7/2007 | Schwartz | C03B 23/03 |
| | | | 65/104 |
| 7,497,093 B2 | 3/2009 | Rosenflanz | |
| 7,507,918 B2 | 3/2009 | Kazama | |
| 7,799,158 B2 | 9/2010 | Yokoyama et al. | |
| 7,902,474 B2 | 3/2011 | Mittleman | |
| 7,915,556 B2 | 3/2011 | Ou | |
| 7,966,785 B2 | 6/2011 | Zadesky et al. | |
| 8,003,217 B2 | 8/2011 | Rosenflanz | |
| 8,050,019 B2 | 11/2011 | Wennemer | |
| 8,212,455 B2 | 7/2012 | Yura et al. | |
| 8,431,849 B2 | 4/2013 | Chen | |
| 8,446,264 B2 | 5/2013 | Tanase | |
| 8,665,160 B2 | 3/2014 | Uttermann et al. | |
| 8,717,513 B2 | 5/2014 | Park et al. | |
| 8,840,997 B2 | 9/2014 | Koyama et al. | |
| 9,001,503 B1 | 4/2015 | Hibino | |
| 9,030,440 B2 | 5/2015 | Pope | |
| 9,069,198 B2 | 6/2015 | Kim et al. | |
| 9,110,230 B2 | 8/2015 | Koch, III et al. | |
| 9,125,298 B2 * | 9/2015 | Russell-Clarke | B24B 7/242 |
| 9,140,522 B1 | 9/2015 | Miller et al. | |
| 9,154,678 B2 | 10/2015 | Kwong et al. | |
| 9,193,625 B2 | 11/2015 | Bookbinder et al. | |
| 9,232,672 B2 | 1/2016 | Kwong | |
| 9,249,045 B2 | 2/2016 | Gabel et al. | |
| 9,263,209 B2 | 2/2016 | Chen | |
| 9,359,251 B2 | 6/2016 | Bookbinder et al. | |
| 9,390,930 B2 | 7/2016 | Rogers et al. | |
| 9,392,706 B2 | 7/2016 | Yoo et al. | |
| 9,429,997 B2 | 8/2016 | Myers et al. | |
| 9,474,174 B2 | 10/2016 | Motohashi | |
| 9,522,836 B2 | 12/2016 | Gulati et al. | |
| 9,524,413 B2 | 12/2016 | Kim | |
| 9,632,537 B2 | 4/2017 | Memering et al. | |
| 9,674,322 B2 | 6/2017 | Motohashi et al. | |
| 9,678,540 B2 | 6/2017 | Memering et al. | |
| 9,697,409 B2 | 7/2017 | Myers | |
| 9,718,727 B2 | 8/2017 | Bookbinder et al. | |
| 9,728,349 B2 | 8/2017 | Huang | |
| 9,840,435 B2 | 12/2017 | Ohara et al. | |
| 9,846,473 B1 | 12/2017 | Kalscheur et al. | |
| 9,870,880 B2 | 1/2018 | Zercoe | |
| 9,890,074 B2 | 2/2018 | Liu | |
| 9,897,574 B2 | 2/2018 | Roussev et al. | |
| 9,941,074 B2 | 4/2018 | Tu | |
| 9,946,302 B2 | 4/2018 | Franklin et al. | |
| 10,133,156 B2 | 11/2018 | Pilliod et al. | |
| 10,141,133 B2 | 11/2018 | Bae | |
| 10,146,982 B2 | 12/2018 | Hsu | |
| 10,318,783 B2 | 6/2019 | Kang | |
| 10,324,496 B2 | 6/2019 | Kwong et al. | |
| 10,357,945 B2 | 7/2019 | Beall et al. | |
| 10,425,994 B2 | 9/2019 | Weiss et al. | |
| 10,494,860 B1 | 12/2019 | Jones et al. | |
| 10,694,010 B2 | 6/2020 | Jones et al. | |
| 10,702,211 B2 | 7/2020 | Clavelle et al. | |
| 10,800,141 B2 * | 10/2020 | Bartlow | B32B 17/00 |
| 10,827,635 B1 | 11/2020 | Limarga et al. | |
| 10,875,277 B2 * | 12/2020 | Aoki | B32B 17/10119 |
| 10,899,660 B2 | 1/2021 | Luzzato et al. | |
| 10,917,505 B2 | 2/2021 | Jones et al. | |
| 10,919,270 B2 * | 2/2021 | Oh | B32B 17/10082 |
| 11,192,823 B2 | 12/2021 | Li et al. | |
| 11,199,929 B2 | 12/2021 | Poole et al. | |
| 2003/0040346 A1 | 2/2003 | Fukuda et al. | |
| 2003/0062490 A1 | 4/2003 | Fujieda | |
| 2004/0003627 A1 | 1/2004 | Hashima | |
| 2004/0041504 A1 | 3/2004 | Ozolins | |
| 2004/0105026 A1 | 6/2004 | Campbell et al. | |
| 2005/0135724 A1 | 6/2005 | Helvajian | |
| 2005/0166639 A1 * | 8/2005 | Skeen | B32B 17/10293 |
| | | | 65/115 |
| 2005/0176506 A1 | 8/2005 | Goto | |
| 2008/0049980 A1 | 2/2008 | Castaneda | |
| 2009/0040737 A1 | 2/2009 | Shimura | |
| 2009/0108477 A1 * | 4/2009 | Yamakaji | C03B 23/0357 |
| | | | 264/1.21 |
| 2009/0127727 A1 * | 5/2009 | Matsushima | C03B 23/0252 |
| | | | 264/1.7 |
| 2009/0194913 A1 * | 8/2009 | Chang | G03F 7/0002 |
| | | | 264/447 |
| 2010/0013786 A1 | 1/2010 | Nishikawa et al. | |
| 2010/0108486 A1 | 5/2010 | Yoshida | |
| 2010/0127420 A1 | 5/2010 | Dannoux | |
| 2010/0148996 A1 | 6/2010 | Wang | |
| 2010/0263708 A1 | 10/2010 | Reichart et al. | |
| 2010/0279068 A1 | 11/2010 | Cook et al. | |
| 2010/0285310 A1 * | 11/2010 | Izutani | B32B 17/10761 |
| | | | 428/337 |

(56) References Cited

U.S. PATENT DOCUMENTS

| | | | |
|---|---|---|---|
| 2010/0316847 A1* | 12/2010 | Schillert | C03B 23/0302 428/174 |
| 2010/0330814 A1 | 12/2010 | Yokota | |
| 2011/0038115 A1 | 2/2011 | Halkosaari | |
| 2011/0041987 A1 | 2/2011 | Hori et al. | |
| 2011/0177300 A1 | 7/2011 | Hankey et al. | |
| 2011/0221993 A1* | 9/2011 | Hsu | G02B 5/3025 349/57 |
| 2011/0253520 A1 | 10/2011 | Lim | |
| 2011/0281093 A1* | 11/2011 | Gulati | C03C 21/00 428/213 |
| 2012/0052271 A1 | 3/2012 | Gomez et al. | |
| 2012/0176760 A1 | 7/2012 | Cohen et al. | |
| 2012/0206669 A1 | 8/2012 | Kim | |
| 2012/0236526 A1 | 9/2012 | Weber | |
| 2012/0250273 A1 | 10/2012 | Kuo | |
| 2012/0304376 A1* | 12/2012 | Neidich | B29C 43/003 4/555 |
| 2012/0327325 A1 | 12/2012 | Park et al. | |
| 2013/0083506 A1* | 4/2013 | Wright | G06F 1/1626 361/807 |
| 2013/0128434 A1 | 5/2013 | Yamamoto et al. | |
| 2013/0141693 A1* | 6/2013 | McCabe | G02C 7/108 351/159.56 |
| 2013/0236699 A1 | 9/2013 | Prest et al. | |
| 2014/0065374 A1* | 3/2014 | Tsuchiya | C03C 3/087 428/174 |
| 2014/0093702 A1 | 4/2014 | Kitajima | |
| 2014/0116090 A1* | 5/2014 | Lee | H05B 6/78 65/30.14 |
| 2014/0151320 A1* | 6/2014 | Chang | C03C 21/002 215/12.2 |
| 2014/0272298 A1 | 9/2014 | Memering et al. | |
| 2014/0285956 A1 | 9/2014 | Russell-Clarke et al. | |
| 2014/0311882 A1 | 10/2014 | Terashita | |
| 2015/0002993 A1 | 1/2015 | Lee | |
| 2015/0030834 A1 | 1/2015 | Morey et al. | |
| 2015/0030859 A1 | 1/2015 | Rogers et al. | |
| 2015/0044445 A1* | 2/2015 | Garner | C03C 23/0025 428/220 |
| 2015/0077830 A1 | 3/2015 | Lin et al. | |
| 2015/0093581 A1* | 4/2015 | Murata | C03C 3/093 428/410 |
| 2015/0104618 A1* | 4/2015 | Hayashi | C03C 8/16 428/174 |
| 2015/0122406 A1* | 5/2015 | Fisher | B32B 37/182 156/222 |
| 2015/0163382 A1 | 6/2015 | Kwong et al. | |
| 2015/0165548 A1 | 6/2015 | Marjanovic et al. | |
| 2015/0202854 A1* | 7/2015 | Tsuchiya | B32B 1/00 428/179 |
| 2015/0210588 A1* | 7/2015 | Chang | B32B 37/12 361/750 |
| 2015/0212247 A1* | 7/2015 | Borrelli | C03C 3/091 359/487.06 |
| 2015/0232366 A1* | 8/2015 | Fredholm | C03B 23/03 65/290 |
| 2015/0241732 A1 | 8/2015 | Kim et al. | |
| 2015/0245514 A1 | 8/2015 | Choung | |
| 2015/0274572 A1* | 10/2015 | Wada | C03B 23/0305 65/106 |
| 2015/0299036 A1* | 10/2015 | Ukrainczyk | C04B 35/19 65/30.13 |
| 2016/0028931 A1 | 1/2016 | Kwong et al. | |
| 2016/0083282 A1* | 3/2016 | Jouanno | B32B 17/10 156/102 |
| 2016/0121583 A1* | 5/2016 | Edwards | B23K 26/206 428/215 |
| 2016/0137550 A1* | 5/2016 | Murata | C03C 21/002 428/141 |
| 2016/0224142 A1 | 8/2016 | Yang et al. | |
| 2016/0270247 A1 | 9/2016 | Jones et al. | |
| 2016/0272530 A1* | 9/2016 | Hall | C22C 19/03 |
| 2016/0354996 A1* | 12/2016 | Alder | B32B 17/10174 |
| 2016/0357294 A1 | 12/2016 | Czeki et al. | |
| 2016/0377768 A1 | 12/2016 | Wilson et al. | |
| 2017/0059749 A1* | 3/2017 | Wakatsuki | C03B 23/02 |
| 2017/0066223 A1* | 3/2017 | Notsu | B32B 17/10036 |
| 2017/0182739 A1* | 6/2017 | Couillard | B32B 3/28 |
| 2017/0282503 A1* | 10/2017 | Peng | C03B 17/064 |
| 2017/0300114 A1 | 10/2017 | Matsuyuki et al. | |
| 2017/0305788 A1* | 10/2017 | Nikulin | B32B 17/06 |
| 2017/0311466 A1 | 10/2017 | Memering et al. | |
| 2017/0334770 A1* | 11/2017 | Luzzato | C03C 4/18 |
| 2017/0340518 A1* | 11/2017 | Logunov | G06K 9/00577 |
| 2017/0355633 A1* | 12/2017 | Cook | C03C 17/02 |
| 2017/0364172 A1 | 12/2017 | Kim et al. | |
| 2018/0009697 A1* | 1/2018 | He | C03C 17/23 |
| 2018/0024274 A1 | 1/2018 | Rogers et al. | |
| 2018/0067212 A1 | 3/2018 | Wilson et al. | |
| 2018/0086026 A1 | 3/2018 | Nguyen et al. | |
| 2018/0088399 A1* | 3/2018 | Fukushi | C03B 23/0357 |
| 2018/0125756 A1* | 5/2018 | Gerrish | C03B 23/245 |
| 2018/0126704 A1* | 5/2018 | Zhang | C03B 23/203 |
| 2018/0134606 A1 | 5/2018 | Wagner et al. | |
| 2018/0154615 A1* | 6/2018 | Dohn | B32B 17/10091 |
| 2018/0237325 A1 | 8/2018 | Li et al. | |
| 2018/0282207 A1* | 10/2018 | Fujii | C03B 40/00 |
| 2018/0304588 A1* | 10/2018 | Harris | B32B 17/06 |
| 2018/0304825 A1* | 10/2018 | Mattelet | B60R 13/0243 |
| 2018/0326704 A1* | 11/2018 | Harris | C03C 3/091 |
| 2018/0370843 A1* | 12/2018 | Gross | B32B 17/10119 |
| 2019/0022979 A1 | 1/2019 | Luzzato et al. | |
| 2019/0030861 A1* | 1/2019 | Bellman | C03C 27/06 |
| 2019/0033144 A1 | 1/2019 | Andrews et al. | |
| 2019/0037690 A1 | 1/2019 | Wilson et al. | |
| 2019/0134944 A1* | 5/2019 | Dawson-Elli | B32B 17/10761 |
| 2019/0160787 A1 | 5/2019 | Bartlow et al. | |
| 2019/0161402 A1* | 5/2019 | Harris | B32B 17/06 |
| 2019/0169061 A1 | 6/2019 | Jones et al. | |
| 2019/0177215 A1 | 6/2019 | Jin et al. | |
| 2019/0219463 A1 | 7/2019 | Orihara et al. | |
| 2019/0263708 A1* | 8/2019 | Bookbinder | C03B 23/03 |
| 2019/0293838 A1 | 9/2019 | Haba et al. | |
| 2020/0014780 A1 | 1/2020 | Jones et al. | |
| 2020/0039186 A1* | 2/2020 | Yuan | C03B 23/03 |
| 2020/0055281 A1* | 2/2020 | Yoon | B32B 17/10119 |
| 2020/0095159 A1 | 3/2020 | Marshall et al. | |
| 2020/0301527 A1 | 9/2020 | Poole et al. | |
| 2020/0323440 A1 | 10/2020 | Vule et al. | |
| 2020/0339472 A1* | 10/2020 | Yoon | B32B 17/10119 |
| 2020/0346525 A1* | 11/2020 | Mannheim Astete | B32B 17/10889 |
| 2020/0369560 A1 | 11/2020 | Takeda et al. | |
| 2020/0407266 A1* | 12/2020 | Suzuki | C03C 3/091 |
| 2021/0009469 A1 | 1/2021 | Marshall et al. | |
| 2021/0014992 A1 | 1/2021 | Limarga et al. | |
| 2021/0016547 A1 | 1/2021 | Bartlow et al. | |
| 2021/0033757 A1 | 2/2021 | Wilson et al. | |
| 2021/0072789 A1 | 3/2021 | Rogers et al. | |
| 2021/0303031 A1 | 9/2021 | Poole et al. | |
| 2021/0361233 A1 | 11/2021 | Wilson et al. | |
| 2022/0009823 A1 | 1/2022 | Dejneka et al. | |
| 2022/0117094 A1 | 4/2022 | Prest et al. | |

FOREIGN PATENT DOCUMENTS

| | | |
|---|---|---|
| CN | 104837781 | 8/2015 |
| CN | 105765722 | 7/2016 |
| CN | 106007345 | 10/2016 |
| CN | 106341962 | 1/2017 |
| CN | 106485275 | 3/2017 |
| CN | 108017263 | 5/2018 |
| CN | 108285263 | 7/2018 |
| CN | 108545917 | 9/2018 |
| CN | 108600419 | 9/2018 |
| CN | 108632510 | 10/2018 |
| CN | 110857865 | 3/2020 |
| CN | 215010334 | 12/2021 |
| DE | 102016107630 | 10/2017 |
| JP | S6042176 | 9/1985 |
| JP | S6271215 | 5/1987 |

(56) References Cited

FOREIGN PATENT DOCUMENTS

| | | | |
|---|---|---|---|
| JP | H03122036 | 5/1991 | |
| TW | 201912602 | 4/2019 | |
| WO | WO2010/077845 | 7/2010 | |
| WO | WO2012/027660 | 3/2012 | |
| WO | WO2012/074983 | 6/2012 | |
| WO | WO-2012074983 A1 * | 6/2012 | ............. C03C 3/083 |
| WO | WO2014/022356 | 2/2014 | |
| WO | WO2014/022681 | 2/2014 | |
| WO | WO2015/0031420 | 3/2015 | |
| WO | WO2015/095089 | 6/2015 | |
| WO | WO2016/065118 | 4/2016 | |
| WO | WO-2017196800 A1 * | 11/2017 | ....... B32B 17/10834 |
| WO | WO2019/199791 | 10/2019 | |
| WO | WO2019213364 | 11/2019 | |

OTHER PUBLICATIONS

Moriceau et al., "Overview of recent direct wafer bonding advances and applications," Advances in Natural Sciences: Nanoscience and Nanotechnology, vol. 1, No. 043004, 11 pages, 2010.

Mao et al., "Fabrication and characterization of 20 nm planar nanofluidic channels by glass-glass and glass-silicon bonding," www.rsc.org/loc, 8 pages, Jun. 30, 2005.

Decourcelle, et al., "Controlling Anisotropy," Conference Proceedings, All Eyes on Glass, Glass Performance Days, Tampere, Finland, Jun. 28-30, 2017.

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Dudutis et al., Bessel beam asymmetry control for glass dicing applications, Procedia CIRP 74, pp. 333-338, 2018.

Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.

Jenne et al., "High-quality Tailored-edge Cleaving Using Aberration-corrected Bessel-like Beams," arXiv:2010.10226v1 [physics.optics], May 8, 2018.

Ungaro et al., "Using phase-corrected Bessel beams to cut glass substrates with a chamfered edge," Applied Optics, vol. 60, No. 3, p. 714, Dec. 10, 2020.

Author Unknown, "Handbook for Interior Designers," 3 pages, 1998.

* cited by examiner

THERMOFORMED COVER GLASS FOR AN ELECTRONIC DEVICE

CROSS-REFERENCE TO RELATED APPLICATIONS

This application claims the benefit under 35 U.S.C. § 119(e) of U.S. Provisional Patent Application No. 62/398,611, filed on Sep. 23, 2016, and entitled "Thermoformed Cover Glass for an Electronic Device," U.S. Provisional Patent Application No. 62/398,616, filed on Sep. 23, 2016, and entitled "Thermoformed Cover Glass for an Electronic Device," U.S. Provisional Patent Application No. 62/398,627, filed on Sep. 23, 2016, and entitled "Thermoformed Cover Glass for an Electronic Device," the contents of which are incorporated by reference as if fully disclosed herein.

FIELD

The described embodiments relate generally to thermoformed glass articles. More particularly, the present embodiments relate to thermoforming glass articles with improved performance attributes.

BACKGROUND

The cover sheet for a small form factor device, like a handheld electronic device, is typically made of polished glass. While polished glass is readily available and relatively inexpensive, it may be susceptible to damage due to an impact or fall. Additionally, glass sheets are typically flat, which may limit the form factor or shape of the electronic device. The articles, systems, and techniques described herein are directed to glass that has been strengthened in conjunction with a thermoforming process used to provide a contoured or curved shape.

SUMMARY

Various embodiments described herein encompass improving a glasses properties during thermoforming of the glass into a specified contoured shape. Thermoformed glass can include complex contoured shapes, including curvatures, necessary for cover sheets in handheld and wearable electronic devices. Properties that can be improved during thermoforming include, hardness, strength, scratch resistance, tactile feel, superhydrophobicity, elasticity, and improved outer geometries.

In one embodiment, a method for forming a cover sheet for an electronic device is described. The method includes, applying a property-enhancing material to a surface of a glass sheet, where the glass sheet has a mechanical property or characteristic. Apply heat to the surface of the glass sheet. Applying pressure to the heated surface of the glass sheet which conforms the glass sheet to a contoured shape of a mold. Once heated and formed to the mold shape, the glass sheet is termed a contoured sheet. The contoured sheet has been chemically modified by addition of the property-enhancing material during the heating and pressure application steps such that the mechanical characteristic is altered. The contoured sheet is cooled to form a cover sheet.

In some aspects, the property-enhancing material is a hard ceramic powder. The hard ceramic powder modifies the surface of the cover sheet to be scratch resistant. Hard ceramic powders as described herein include: $MgAl_2O_4$ powder, sapphire powder and powdered zirconia.

In other aspects, the property-enhancing material is an alkali metal. The alkali metal is used to modify the surface of the cover sheet so as to have greater strength. For example, the alkali metal can be a potassium ion, and the cover sheet can be modified to have an increase in potassium ions distributed along and within the cover sheet surface.

In still other aspects, the applying pressure to the heated surface includes applying a first pressure to a first portion of the glass sheet, and a second pressure to a second portion of the glass sheet. The differential application of pressure on the glass sheets causes a density difference between the first and second portions of the glass sheet. In addition, the cooling of the contoured sheet can include cooling a first portion of the glass sheet surface at a first cooling rate, while cooling a second portion of the glass sheet at a second cooling rate. the differential cooling on the glass sheets causes a density or compression difference between the first and second portions of the glass sheet.

It is also noted that the chemical modifications of the surface of the glass sheet can occur during the formation of the contoured sheet, and in some instances, the application of the heat and pressure are through the use of a thermoform molding machine.

In another embodiment, an electronic device is described having a housing, a display positioned within the housing, and a cover glass positioned over the display. The cover glass further has a contoured shape formed by the thermoforming process and a strengthened layer having a penetration profile resulting from the thermoforming process.

In aspects of the electronic device, the cover glass has a base glass having a first melting point with a cladding layer formed over the base glass. The cladding layer includes a glass material that has a second melting point that is lower than the first melting point. Aspects also include having the contoured shape of the cover glass formed using a thermoforming process, where a ceramic material is embedded during the thermoforming process. The ceramic material can be one or more of: $MgAl_2O_4$ powder, sapphire powder, or powdered zirconia.

In other aspects of the electronic device, the contoured shape of the cover glass includes a pair of curved portions that extend along a corresponding pair of edges of the contoured sheet. The curved portions, in this case, form a continuous curved surface with the housing of the electronic device.

Embodiments herein also describe a cover glass for an electronic device that includes a glass substrate with a strengthened surface layer formed within the glass substrate. The strengthened surface layer has a contoured shape and a penetration profile created by a thermoforming process. Aspects of the cover glass include a transparent window that acts a display. In other aspects, the contour shape and strengthened surface layer are formed during the thermoforming process. In some cases, the strengthened surface layer has an increased sodium ion density.

BRIEF DESCRIPTION OF THE DRAWINGS

The disclosure will be readily understood by the following detailed description in conjunction with the accompanying drawings, wherein like reference numerals designate like structural elements, and in which:

FIG. 21B shows a schematic of the two glass sheets in FIG. 21A having a cladding layer positioned there-between.

Figure 1:
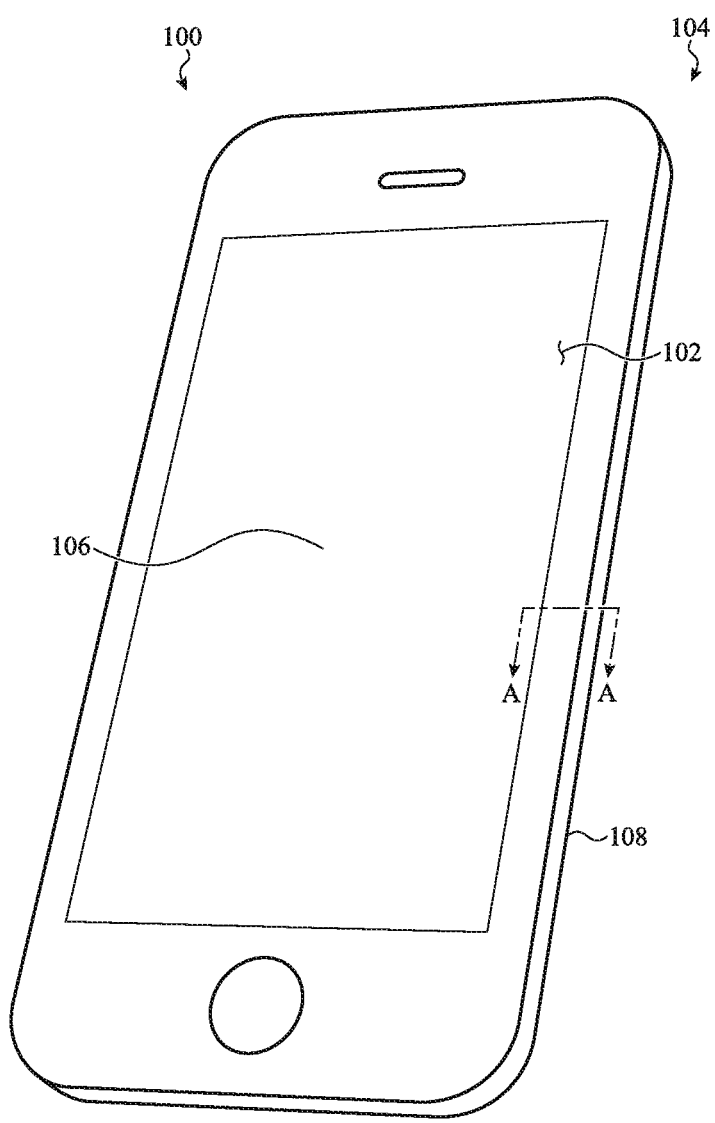
FIG. 1 shows an electronic device having a housing in accordance with embodiments herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to glass articles, methods of producing glass articles, and to the utility of such glass articles in an electronic device. Embodiments also relate to an increase in the strength, hardness and/or elasticity of glass, especially related to glass in an electronic device, as well as to the cosmetic feel or superhydrophobicity (a glass surface that is hydrophobic and prevents water retention) of glass in an electronic device. Methods of producing such glass articles relate to thermoforming glass to a desired contour or geometry while, at the same time, enhancing one or more of its mechanical characteristics or properties. For purposes herein, a mechanical characteristic or property refers to strength, hardness, elasticity, tactile feel, superhydrophobicity, and the like.

Aspects of the disclosure include, thermoforming a glass sheet to a desired contour shape and property attribute. The glass sheet can have one or more mechanical characteristics. The mechanical characteristic is present in the glass sheet prior to the thermoforming processes described herein. Utilization of modified thermoforming processes alleviates the need for additional post processing treatments, particularly as these treatments relate to an electronic device. Modifications to the thermoforming process, thermoforming molds, and glass formed by thermoforming allows for a significant improvement in glass for a particular use, as well as to the methods for manufacturing the glass for a particular use. In this manner, the mechanical characteristic of the glass sheet is altered to an improved mechanical characteristic, for example, an improvement in glass strength, hardness, elasticity, texture and the like.

In one example, the glass article may be an outer surface of an electronic device. The glass article may correspond to a cover sheet that helps form part of a display area, or, in some instances, be involved in forming part of the housing. A display may comprise a transparent window. The embodiments herein are particularly relevant for use in portable electronic devices, and small form factor electronic devices, e.g., laptops, mobile phones, tablet computers, smart watches, media players, health-monitoring devices, remote control units, and the like. Typical glass articles herein are thin, and typically less than 5 mm in thickness, and more typically less than 3 mm in thickness. In some aspects, the glass article can be from about 0.1 mm to 2 mm in thickness, and more typically from 0.15 mm to 1 mm in thickness.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates one embodiment of a portable electronic device 100. The portable electronic device 100 includes a glass article 102 (which in this case is a cover sheet) and an enclosure or housing 104. The cover sheet 102 can have a front surface 106, back surface (not shown), and side surfaces (not shown). The various surfaces can be composed of zones and/or portions. An example zone of the cover sheet could be the entire front surface 106, while the back surface would be considered a different zone. The cover sheet 102 may also define a window region through which the display of the device is visible. Various properties of the zones may differ on the use, for example, a front surface, exposed to the outside environment, may require a different mechanical property or characteristic, hardness for example, than the back surface, enclosed away from the environment.

The enclosure includes a housing body 108 and cover sheet 102 that together define an interior volume that is configured to enclose the various electronic components of the device. For example, the housing body 108 may define an opening in which a display is positioned. The cover sheet 102 is positioned over the display and forms a portion of the exterior surface of the device. The display may include a liquid crystal display (LCD), an organic light-emitting diode (OLED) display, a transparent window, or other suitable display elements or components.

In accordance with embodiments herein, the cover sheet 102 has been thermoformed to a required contoured shape for the electronic device, with enhanced properties. Enhanced properties can be localized to specific zones of the cover sheet 102 or can be globally modified during the thermoforming process. Some embodiments herein utilize property-enhancing materials to improve scratch resistance, hardness, and strength, and the like, for example. In FIG. 1 the contoured shape of the cover sheet forms a continuous curved surface with the housing body.

Figure 2:
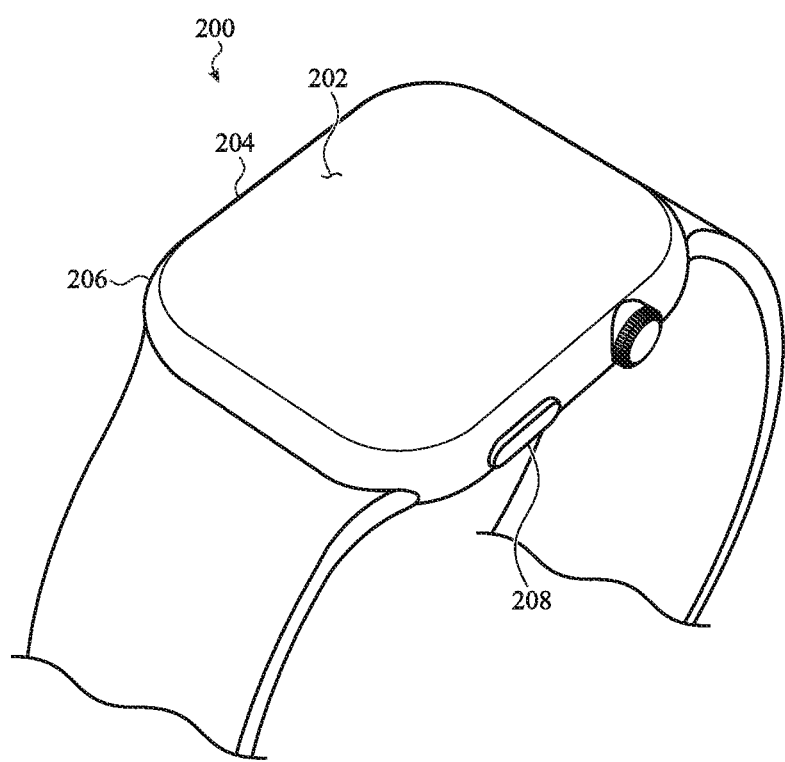
FIG. 2 shows a wearable electronic device having a housing in accordance with embodiments herein.

FIG. 2 illustrates another embodiment of a portable electronic device, in this case a wearable electronic device 200. The glass article 202 in this illustrative embodiment is a thermoformed cover sheet with enhanced strengthening. A watch housing body 204 captures the glass 202. The cover sheet 202 has a complex shape that includes a pair of curved portions 206 that extend along a corresponding pair or edges of the contoured shape. The curved portions 206 can be configured during thermoforming to form a continuous curved surface with the housing of the electronic device. As can be appreciated, thermoforming various glass article geometries can eliminate the need for post processing steps and allows for improved manufacturing of electronic device having a need for thin, complex shapes with high tolerances. Illustrative buttons 208 extend from the device for user interface.

Figure 3A:
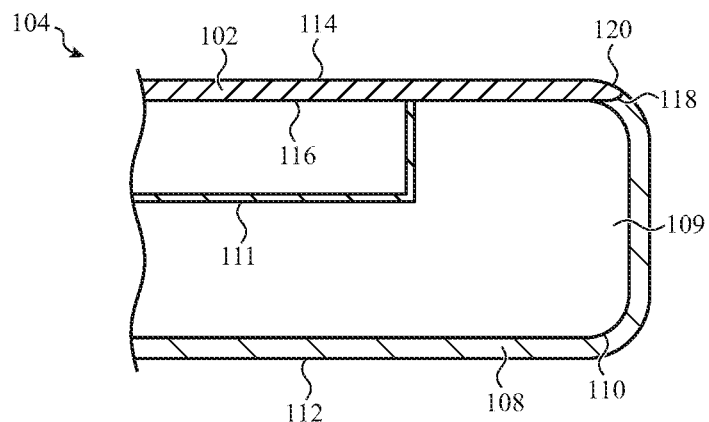
FIG. 3A is a cross-sectional view of an enclosure having a housing body and cover sheet in accordance with embodiments herein.

FIG. 3A is an illustrative cross-sectional view of an enclosure 104 along section A-A of a device similar to the one shown in FIG. 1. In particular, a housing body 108 composed of an aluminum alloy, ceramic or other like material defines an opening. A thermoformed cover sheet 102 is attached to the housing body 108 to cover the opening and define an enclosed volume 109. Within the enclosed volume, the housing body has an internal 110 and external surface 112, where the internal surface 110 supports and surrounds various structural and electronic components of the mobile phone (not shown).

Figure 3B:
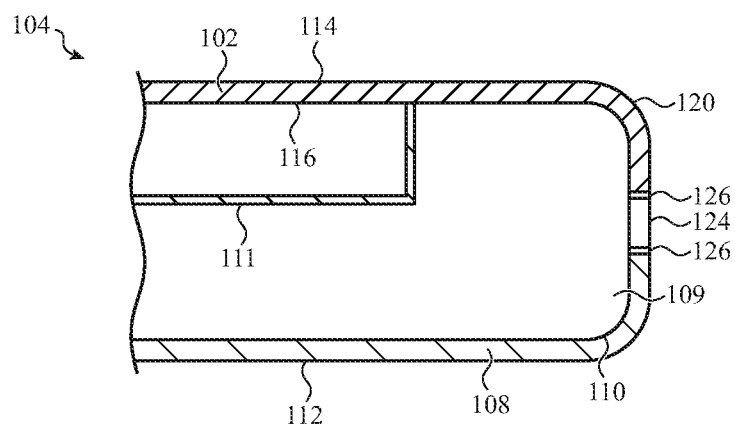
FIG. 3B is another cross-sectional view of an enclosure having a housing body and cover sheet in accordance with embodiments herein.
Figure 3C:
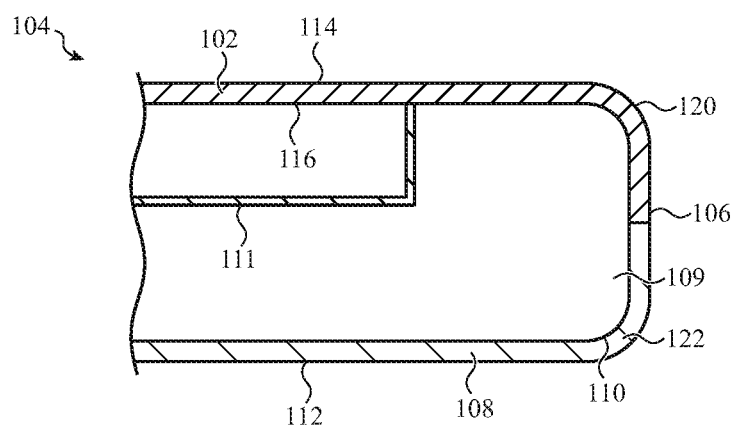
FIG. 3C is a still another cross-sectional view of an enclosure having a housing body and cover sheet in accordance with embodiments herein.

The cover sheet 102 has a front surface 114, back surface 116, and side surface 118. The cover sheet 102 is positioned over the display 111. Each surface of the cover sheet can be composed or one or more zones or portions. The front surface 114 of the cover sheet 102 is exposed to the environment, while the back surface 116 is exposed to the enclosed volume 109 of the illustrative electronic device 100. The cover sheet 102 is thin, and typically less than 5 mm in thickness, and in most cases less than 3 mm in thickness. In some aspects, the cover sheet has a thickness of from about 0.1 mm and 2 mm, and in other aspects from about 0.15 mm to 1 mm. The cover sheet 102 can be shaped to a desired contour during thermoforming so as to fit the use, including at the side surfaces 118 (or edges), where a pair of curved portions can occur. As shown in FIG. 3A-3C, the curved portions 120 can be configured to form a continuous curved surface with the housing body 108 of the electronic device 100.

FIG. 3B shows a similar cross-sectional view of an enclosure 104, as shown in FIG. 3A, except the thermoformed cover sheet 102 extends to form a top half of the enclosure, while the housing body 108 has a symmetrical curve 122 to form the bottom half of the enclosure. The cover sheet 102 in this embodiment shows a more pronounced curvature 120, as available through the thermoforming process. An antenna 124 and insulation 126 is also shown. As in FIG. 3A, a display is shown. Post machining the curvature shown in the cover sheet of FIG. 3B would be difficult to impossible to attain from a starting piece of flat glass sheet.

FIG. 3C shows another cross-section view of an enclosure, as shown in FIG. 3A, having a highly contoured cover sheet 102, matching housing body 108. As in FIG. 3B, the thermoformed glass shows a pronounced curvature 120, not available in post-processing of a flat glass sheet. A display 111 is provided for reference.

Glass for use herein can be composed of a transparent glass and can include a combination of $SiO_2$, $Al_2O_3$, $B_2O_3$, $Na_2O$, $ZnO$, $Li_2O$, and other known constituents. In typical embodiments, the glass is ion-exchangeable and composed of a lattice having a defined volume. Glass sheets represent glass materials prior to thermoforming, and may include various types and kinds of glass feedstock. Glass sheets have a size, thickness and composition useful for the intended use after thermoforming and property enhancement. In some aspects, the property or characteristic is a mechanical property or characteristic, and the glass sheet is described as having a first mechanical property or characteristic that is altered by the thermoforming process to a second mechanical property or characteristic. Glass sheets can also be described as having a glass substrate such that the glass substrate can be modified with a surface layer of performance-enhancing materials. Glass substrates typically are formed of glass silicates or similar type compounds as is known in the art.

Figure 4:
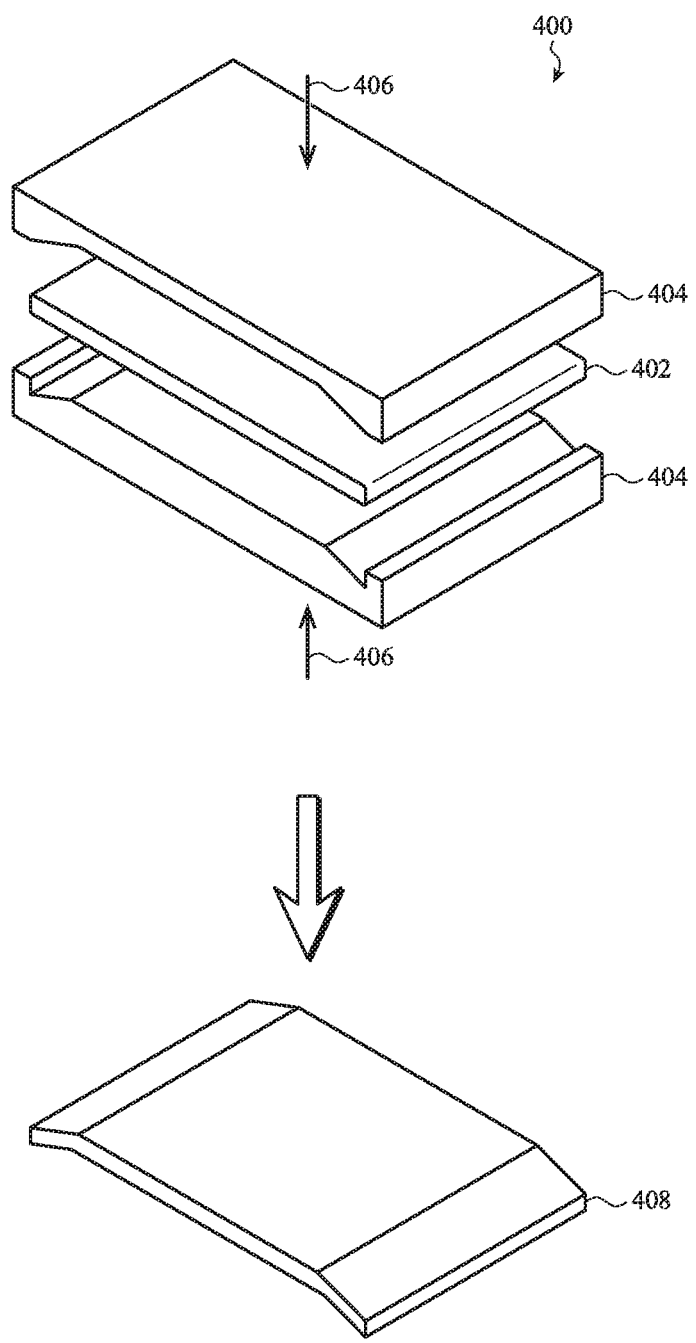
FIG. 4 shows a schematic of thermoforming a glass sheet into a contoured glass sheet.

FIG. 4 illustrates a simplified schematic of thermoforming a glass sheet to a desired contoured shape in accordance with embodiments herein 400. A glass sheet 402 in need of a particular shape is heated under pressure to above its glass transition temperature to form the desired glass article. Heating of the glass sheet does not reach the glass melting point, as this would render the glass completely liquid. In this regard, a glass sheet 102 is heated to above its glass transition temperature, but below its melting temperature, and placed in an appropriate mold 404 (or the glass sheet is placed in a heated mold), and pressure applied (illustrated by arrow 406) to the glass sheet, in the presence or absence of an applied vacuum (not shown). Heating of the glass sheet, to above the glass transition temperature softens the glass to a rubbery state, where the glass is flexible. This state of glass is receptive to pressure 406 and allows for contour modifications of the glass, based on the contours and pressure points applied by the mold 404. The geometric shape and thickness of the glass 402 can be modified to create the appropriate glass article 408, for example a cover sheet for an electronic device. Although typical cover sheets result with a uniform thickness across the entirety of the glass, cover sheets may be formed having non-uniform thickness where the utility of the sheet requires.

During this thermoforming process, the glass 402 is also receptive to various property modifications. Glass that is thermoformed and being shaped is soft and compliable, and can accept various property modifications, for example, strength, surface hardness, scratch resistant surface, surface tactile feel, surface superhydrophobicity and the like.

As such, during the thermoforming procedure, a property or characteristic of the glass may be modified or altered while the glass is in a soft or rubber-like state. The property being modified can correspond to a zone or portion of the surface of the glass (local), or can correspond to an entire surface (global). The property can be changed to a depth and/or distribution based on a penetration profile that results from the thermoforming process.

In one embodiment, a property-enhancing material is applied to the zones of a glass sheet in need of improvement. The glass sheet has a first mechanical property or characteristic. The property-enhancing material is applied prior to the glass thermoforming procedure. In some aspects, the property-enhancing material is applied to the one or more zones of the glass article by a mold, and a mold face or surface in particular. As such, a zone or portion of glass corresponds to a mold surface, or some portion of the mold surface, such that the mold applies the property-enhancing material to the glass sheet surface during the thermoforming process. The resultant glass has an altered mechanical property or characteristic due to the application of the property-enhancing material. In other embodiments, the property being modified in the glass is an intrinsic property, such as density. Here, the mold face or surface applies a change in thermoforming parameters, like temperature or pressure, to modify a property of the glass itself. Both embodiments, addition of a property-enhancing material, and modification of a glasses intrinsic property, will be discussed in more detail below.

Figure 5:
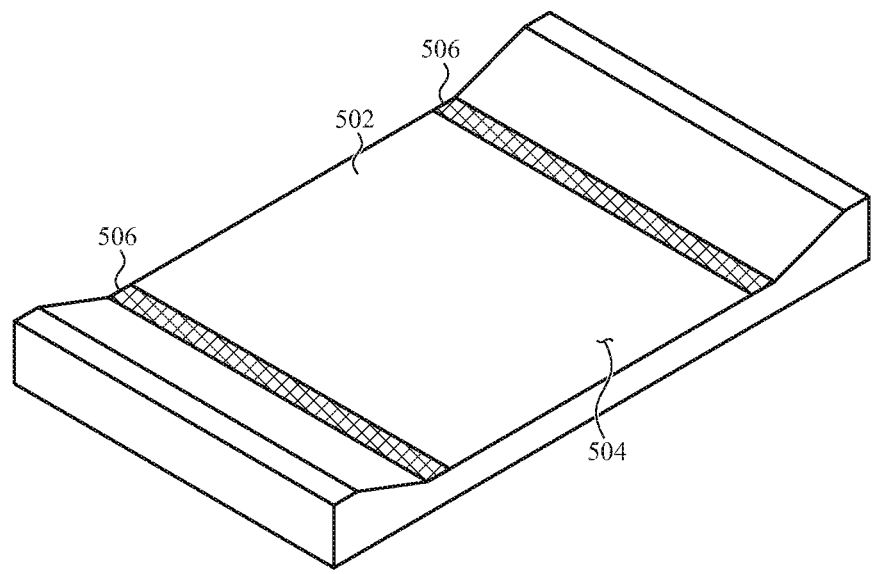
FIG. 5 shows an illustrative view of a female mold face or surface in accordance with embodiments herein.
Figure 6:
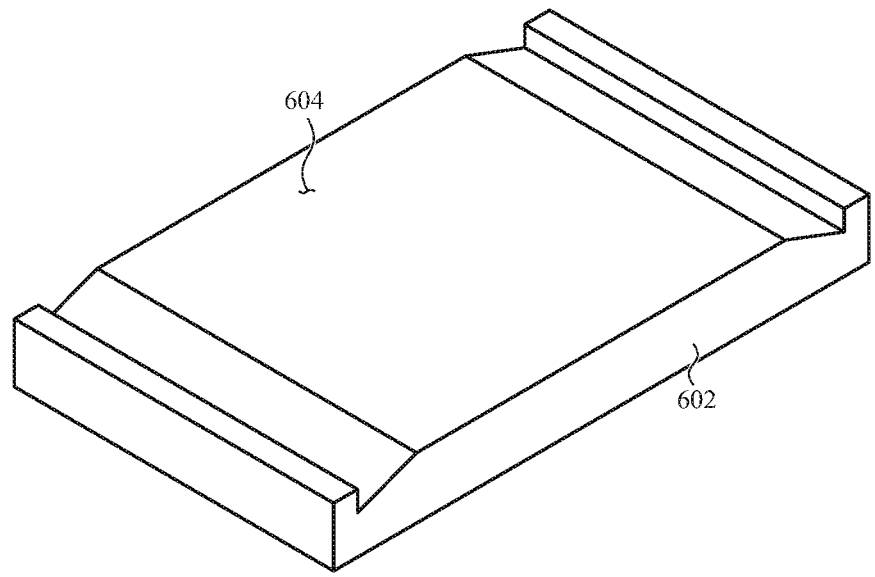
FIG. 6 shows an illustrative view of a male mold face or surface in accordance with embodiments herein.

FIG. 5 and FIG. 6 illustrate the inside face or surface of the top and bottom mold of FIG. 4, respectively. The mold surface is negatively contoured to provide the desired glass article shape during thermoforming. The mold surface, or some portion of the mold surface 506, can also be utilized to apply a property-enhancing material to the glass sheet, while the glass sheet is in a softened or "thermoplastic" state.

As noted above, modification of a glass property can be through application of a property-enhancing material, for example a mechanical property, to the glass surface (termed chemical strengthening) via the mold surface 506. In one embodiment, a hard ceramic powder is deposited locally or globally on the mold surface. In another embodiment, an alkali metal is deposited locally or globally on the mold surface. For purposes herein, the hard ceramic powder and alkali metal are referred to as property-enhancing materials. Also as noted above, the property-enhancing materials can also be applied to the glass sheet prior to placement in the mold, in such cases the material is coated directly on the glass sheet and then placed in an appropriated mold. Application of the property-enhancing material directly to the glass sheet can be prior to the glass sheet being heated, during heating of the glass sheet or after the glass sheet has been appropriately heated, but prior to the glass sheet being placed in the mold.

Figure 7:
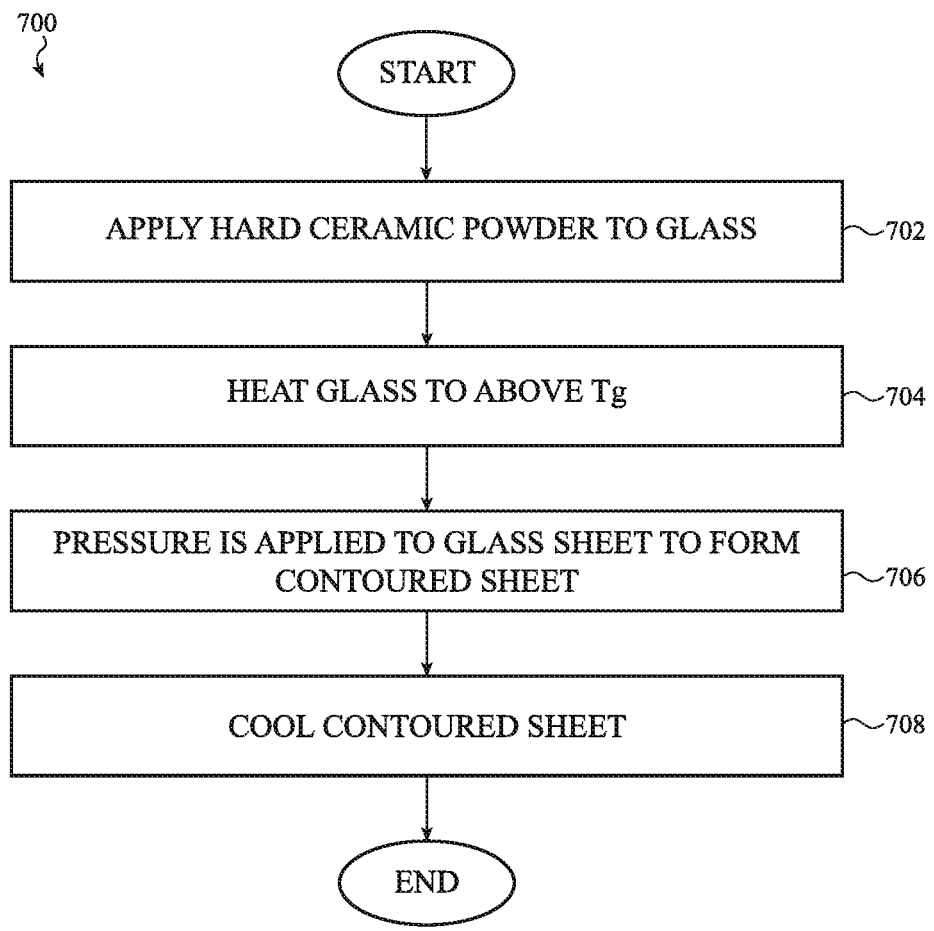
FIG. 7 shows a flow diagram for preparing a thermoformed glass article having hard ceramic powder embedded therein.

FIG. 7 is a flow diagram illustrating a process for increasing the hardness and scratch resistance of one or more zones of a surface in a glass article (for example a cover sheet) 700. A glass sheet that fits the required thickness and area for the intended use is obtained. For example, a glass sheet having a thickness and area that corresponds to a cover sheet for a handheld electronic device. In operation 702, an amount of hard ceramic powder is deposited on the appropriate surface of the glass sheet. The sheet has a first mechanical property associated with its hardness. In one aspect, the hard ceramic powder is deposited directly to the appropriate glass surface, prior to placement in the mold. In another aspect, the hard ceramic powder is applied by an appropriately coated mold surface(s). An amount and type of hard ceramic powder to modify the hardness and scratch resistant properties of the cover sheet is utilized. Hard ceramic powders for use herein include zirconium (powdered zirconia), sapphire (sapphire powder), and spinel ($MgAl_2O_4$ powder), although other like ceramic powders can be used.

Once deposited on the glass sheet, in operation 704, the glass sheet is heated to above its glass transition temperature. In operation 706, pressure is applied through the mold, to conform the glass sheet to a contoured shape of the mold to form a contoured sheet. The hard ceramic powder located on the mold surface becomes embedded in the corresponding zone or zones of the contoured sheet. An appropriate amount of heat and pressure is used to deposit the hard ceramic powder to an appropriate depth and distribution in the contoured sheet, termed the penetration profile. In operation 708, the cover sheet forms during cooling of the contoured sheet, having a penetration profile for the hard ceramic powder imbedded in its surface. The imbedded hard ceramic powder gives the cover sheet improved hardness and scratch resistance wherever the powder has been incorporated. Increased hardness and scratch resistance enhances the damage resistance of the cover sheet. In some embodiments, one, two or more, three or more, four or more, etc. different hard ceramic powders can be used to provide a desired hardness/scratch resistance. The powders can be used alone in a zone, or can be combined and then used in a zone. In some embodiments, a uniform distribution of hard ceramic powder is incorporated into the surface of the entire cover sheet. In one example, the entire front surface of a cover sheet can be imbedded with hard ceramic powder, while the back surface remains untreated. In another example, only a portion of the front surface of the cover sheet is embedded with hard ceramic powder, the portion corresponding to greater user interaction.

Thermoforming parameters (heat, pressure, cooling rate, presence of vacuum, and the like) on a glass sheet herein can be altered or modified to imbed the property-enhancing material to a required depth in the glass article. The resultant inclusion of the property-enhancing material provides a penetration profile for that material. For example, use of higher pressure, greater temperature, or both, will typically result in a profile having a deeper distribution of the property-enhancing material into the glass thickness.

Figure 8:
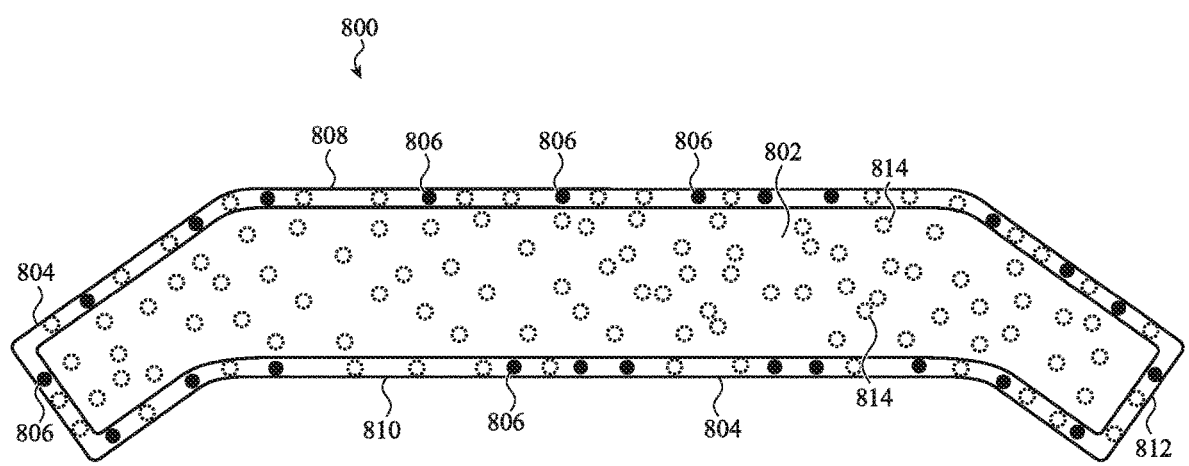
FIG. 8 shows a cross-sectional schematic view of a cover sheet having hard ceramic powder imbedded therein by thermoforming.

FIG. 8 shows the differential incorporation of hard ceramic powder into a surface of a glass article upon thermoforming 800. The glass article 802, along any surface area 804, can incorporate the hard ceramic powder 806 to a particular depth and concentration based on the thermoforming parameters and the amount of hard ceramic powder deposited on the glass surface, and therefor incorporated into the glass article when thermoformed. The hard ceramic powder modifies the glass surface and glass internal stress relationship. The incorporation of the powder generally increases the glass compression and adds hard powder to the glass composition, the combination of which provides a hardened, and scratch resistant, surface. In FIG. 8, the front 808, back 810 and side 812 surfaces of the cover sheet 802 have been modified to include hard ceramic powder 806. The hard ceramic powder was embedded to a consistent depth and distribution, penetration profile. As discussed above, numerous embodiments are available to alter the penetration profile, so for local distribution of the hard ceramic powder, or for differences in the depth and concentration of the hard ceramic powder into a surface of the glass article, and the like.

Figure 9:
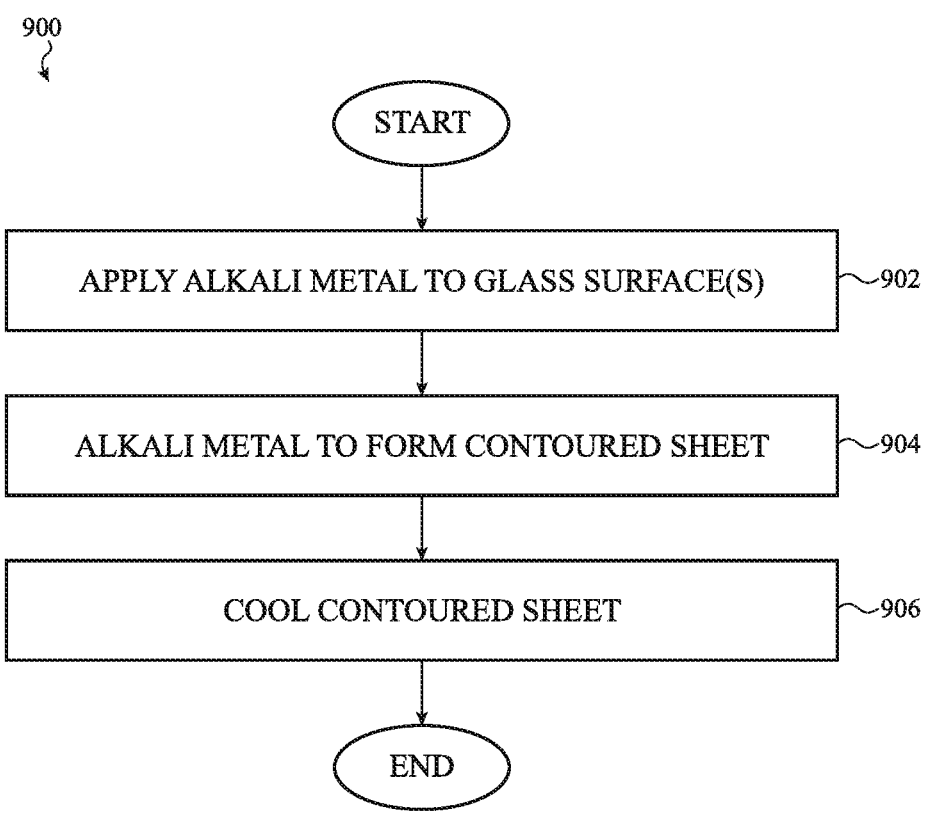
FIG. 9 shows a flow diagram for preparing a thermoformed glass article having alkali metal strengthening.

FIG. 9 is a flow diagram illustrating a process for increasing the chemical strength of one or more zones of a surface in a glass article 900, i.e, via alkali metal incorporation. Alkali treating of a glass article effectively strengthens the surface of glass by adding stress to the glass. Typically, the combination of stresses on a glass article are budgeted to avoid failure and maintain safety, i.e., if you put too much stress into a glass article, the energy will eventually cause the article to break or fracture. Therefore, each glass article has a stress budget, an amount of compressive stress verse tensile strength that provides a safe and reliable glass article. In the present embodiment, alkali metal ions are added to the glass surface to a depth of particular utility. Ions that diffuse into the glass article surface form a compressive stress layer that enhances the surfaces strength.

A glass sheet that fits the required thickness and area for the intended use is obtained. For example, a glass sheet having a thickness and area that corresponds to a cover sheet for a smart phone. The required contour shape and strength is identified for the cover sheet, including zones or portions of the cover sheet in need of an increase in strength. Both symmetric and asymmetric chemical strengthening is contemplated for this embodiment, where the effect of chemical strengthening the glass sheet during thermoforming will keep the inner portion of the cover sheet under tension, while the chemically strengthened layer will be under compression. The depth and compression of the chemically strengthened layer will vary upon the requirements of a particular use, but will depend on the type of alkali ion incorporated into the glass (partly based on the ions size and ability to add compression to the limited volume of the glass) and the thermoforming parameters used to diffuse the ions into the softened glass. The alteration in the mechanical property, strengthening, will result in a penetration profile for the glass sheet.

Still referring to FIG. 9, in operation 902, an alkali metal is deposited on a glass sheet surface, typically via direct contact with the glass sheet or through contact via a corresponding mold face or surface. The glass sheet has a first mechanical property, in this case strength, prior to the thermoforming process. In one aspect, the alkali metal is deposited on the mold surface via a alkali metal rich liner, or via a coating or paste. In one embodiment, the alkali metal is sodium, particularly where the glass is a silicate or soda lime glass, or where the glass has been enriched with lithium. Here, the sodium ions will diffuse into the thermoformed glass surface and form a local or global (depending on the deposit to the mold surface) surface compression layer. In another embodiment, the alkali metal is potassium, particularly where the glass article already incorporates sodium, and requires a larger ion to add compression to the surface.

In operation 904, the glass sheet is thermoformed (heated first and pressure added second) into the correct contoured shape (contoured sheet), while incorporating the alkali metal into the glass surface. In operation 906, the contoured sheet is cooled into a cover sheet, having a distributed ion, like sodium or potassium, diffused in the surface of the target zones (penetration profile). The first mechanical property has now been altered to a second mechanical property consistent with the incorporation of the alkali metal. Where the same amount and type of ion is coated on both sides of the mold, the strengthening of the cover sheet is symmetric. Where only one side, or zone of one side, for example, of the mold surface is coated, the glass will be strengthened asymmetrically. Asymmetric strengthening allows for an increase in strengthening at that localized portion or zone of the glass, i.e., a strengthened layer, as the surface compression layer is localized to one side of the glass (front versus back in this example).

Additional embodiments herein include immersing the thermoformed and chemically strengthened glass article, for example cover sheet, in an ion solution bath to further modify and/or enhance the glass articles strength. For example, a glass article having been thermoformed and strengthened by addition of sodium ion (by immersion in a sodium salt bath), may be further strengthened by immersion in a potassium salt solution bath at an appropriate temperature and for an appropriate amount of time. A glass article may be designed to include multiple zones of symmetric and asymmetric chemical strengthening, formed through a combination of thermoformed chemical strengthening followed by chemical strengthening in ion solution baths. It is also envisioned that a glass article feedstock could first be chemically strengthened via ion bath immersion, for example in a sodium salt solution, followed by targeted strengthening during thermoforming to the geometric shape of the glass article, for example, lining one zone of a mold surface with potassium ion. As can be envisioned, chemical bath strengthening may also include use of masking or ion-diffusion barriers to cover portions of the glass article prior to immersion in the ion containing baths, or can include materials to promote ion diffusion into the glass article, e.g., high concentration ion pastes or coatings.

It is also contemplated that a glass article may include hard ceramic powder and alkali ion strengthening, both incorporated during the same thermoforming process. For example, a zone of the mold could be coated with zirconia, while another zone of the mold lined with a sodium rich liner. In another example, a zone may include both a hard ceramic powder and an alkali metal ion (same zone include both zirconia and sodium ions). In this manner, the hardness and strength of a glass article can be modified during the same thermoforming procedure.

In other embodiments, the mold is physically modified to alter portions of the mold surface to have a different cooling rate, or capacity to exert pressure. Cooling or pressure changes on various portions of the glass sheet can modify the glass articles' density (densification) and thereby its performance, as is discuss in more detail below. In these embodiments, the property enhancement is accomplished by modification of the thermoforming parameters themselves.

Embodiments herein illustrate a thermoforming mold embodiment where the mold itself includes a number of different zones capable of differential cooling or differential pressure inducement. In these embodiments, the mold modifies an intrinsic property of the glass via the thermoforming process itself. In particular, the thermoforming process can be used to modify the density of different portions or zones of the glass article. An increase in glass density, densification, at the surface of a glass can have an effect on the hardness at the surface, for example.

A thermoforming mold can cool at different rates to induce a stress profile in the glass article to result in differential densification of the glass article. Where glass is differentially densified, the glass lattice structure can be modified to provide different volumes for ions to move through, and thus surface areas of hardness or scratch resistance to occur. For example, where a mold zone is cooled at a lower rate, than an adjacent zone, the slower cooling rate results in the glass being more dense at room temperature, than a zone where a fast cooling rate is performed. The slower cooling rates allow structural equilibrium/relaxation in the glass to be maintained during cooling, whereas fast cooling results in the relaxation becoming fixed and therefor the density becoming fixed. A thermoforming mold can also exert pressure at different rates to induce compression in the glass article to result in differential densification of the glass article. So in one zone of the mold, the pressure may be enhanced as compared to an adjacent zone of the mold. The zone where the pressure is greater will result in a glass article having a compressed glass volume in that zone and thereby show greater densification. The adjacent zone, under lower pressure, would have greater volume for ions to move through than the densified zone.

Figure 10A:
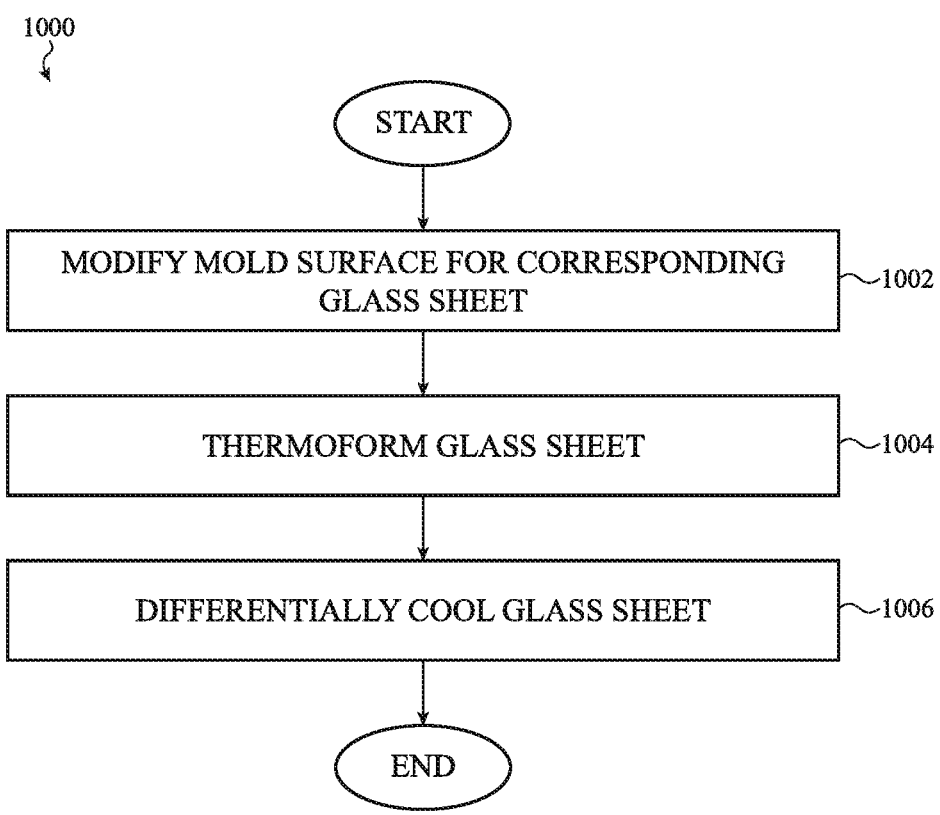
FIG. 10A shows a flow diagram for preparing a thermoformed glass article with increased density using multiple mold cooling zones.

FIG. 10A is a flow diagram illustrating production of a glass article having modified glass density 1000. A glass sheet that fits the required thickness and area for the intended use is obtained. For example, a glass sheet having a thickness and area that corresponds to a cover sheet for a smart phone. The required geometric or contoured shape is identified for the cover sheet, including zones or portions of the cover sheet in need of an increase or decrease in density. In operation 1002, an appropriate mold is modified to exhibit the required cover sheet density pattern. Molds may be modified through the use of different mold materials, having different thermal conductivity, or may be altered to include cooling lines that run below the surface of the mold, such that the temperature of the cooling fluid can be modified to adjust the temperature at the surface of the mold. Control over a cooling zone in the mold allows for control over the cooling rate of the glass sheet, and thus the glass sheet density at that corresponding zone. In operation 1004, the glass sheet is thermoformed to a geometry for a particular use, using the cooling modified mold as described herein. The heated and formed glass sheet is a contoured sheet. In operation 1006, after thermoforming, the glass sheet is differentially cooled in the mold to result in a cover sheet having modified glass surface densities, and therefore, hardness. A mold in accordance with embodiments described above may result in a cover glass where the density of the glass is increased on the front surface, but remain unchanged on the back surface, for example. In other examples, zones on the front or back sheet have locally modified glass density that correspond to a particular need. In this example, the density of zones on the front surface can be densified where user interactions are required.

Figure 10B:
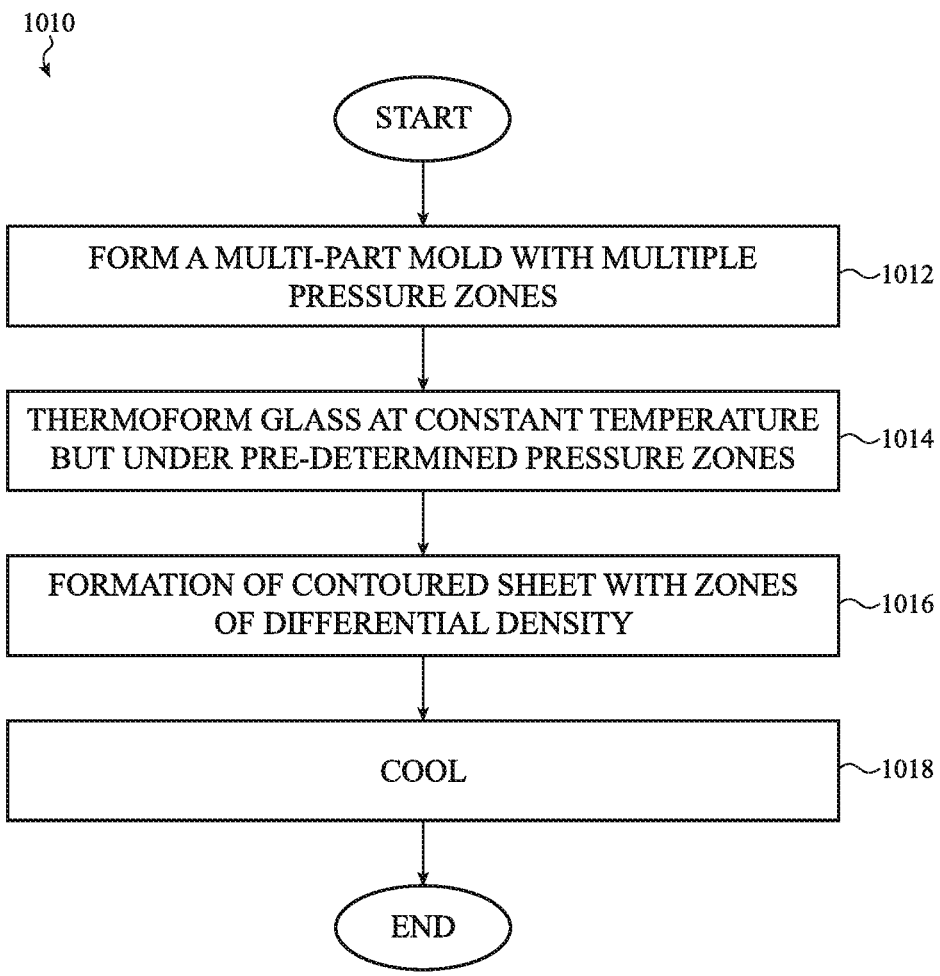
FIG. 10B shows a flow diagram for preparing a thermoformed glass with increased density using multiple mold parts under differential pressure requirements.

FIG. 10B is a flow diagram illustrating production of a glass article also having modified surface glass density 1010. A glass sheet that fits the required thickness and area for the intended use is obtained. For example, a glass sheet having a thickness and area that corresponds to a cover glass for a smart phone. The required geometric shape is identified for the final glass article, a cover sheet for example, including zones or portions of the glass article in need of an increase or decrease in density. In operation 1012, an appropriate mold is modified to exhibit the required glass article density pattern. Multi-part molds may be modified to exert differential pressure on different zones or portions of the glass sheet. In typical embodiments, a mold may be composed of multiple parts, where each part is controlled to exert an independent pressure or force. Mold parts may include a single top mold, and a single bottom mold (able to exert different levels of force), or a top mold composed of two independent parts under independent control (able to exert two different levels of force through the top mold), and a single bottom mold (able to exert one level of force). Mold parts may include any combination that would be useful in forming a desired density pattern on a glass article, including molds that have multiple top and bottom parts, each under its own pressure control.

Still referring to FIG. 10B, in operation 1014, the multi-part mold is heated to above the glass transition temperature (or the mold is not heated but the glass pre-heated to above the glass transition temperature), followed by the differential application of pressure to zones of the glass sheet. In operation 1016, the differential pressure results in formation of the glass sheet contoured shape as well as differential density zones upon cooling. The formed glass sheet is a contoured sheet. As noted above, having a glass sheet with modified density allows for inclusion of higher density and scratch resistance. The contoured sheet is then cooled in accordance with embodiment herein in operation 1018.

A glass article having one or more different surface densities can be further manipulated using chemical strengthening. Chemical strengthening is limited by the saturation limit of the glass for an amount or volume or ions. At saturation, no additional compression layer or depth may be accomplished. Where glass has been densified, a more limited lattice structure is available for ion diffusion. The increased density in the glass surface allows fewer ions to move inwardly, while the concentration of the ion increases at the surface of the glass. Additional chemical strengthening in a densified glass surface results in a glass surface having a shallow compression layer. Shallow compression layers with increased ion inclusion form a shallow, hard surface that is resistant to scratching, for example, i.e., are scratch-resistant. In this manner, glass sheets can be modified to include chemical strengthening on top of normal to densified glass. This allows for a wide array of glass treatments during the thermoforming process to prepare a glass article of numerous useful properties.

Another property of glass that can be modified during the thermoforming process is the tactile texture of a glass article. In one embodiment, the glass texture on a glass article is controlled by having a texture imprinted (texturing) in the glass surface during the thermoforming process (thereby forming a textured surface). In this embodiment, softened glass during the thermoforming process can be imprinted with a textured pattern, typically via a mold surface or face. The negative imprint or pattern of the mold surface is used to add texture to the glass sheet while the glass sheet is undergoing the thermoforming contour changes required for the cover sheet or other like glass article.

Figure 11:
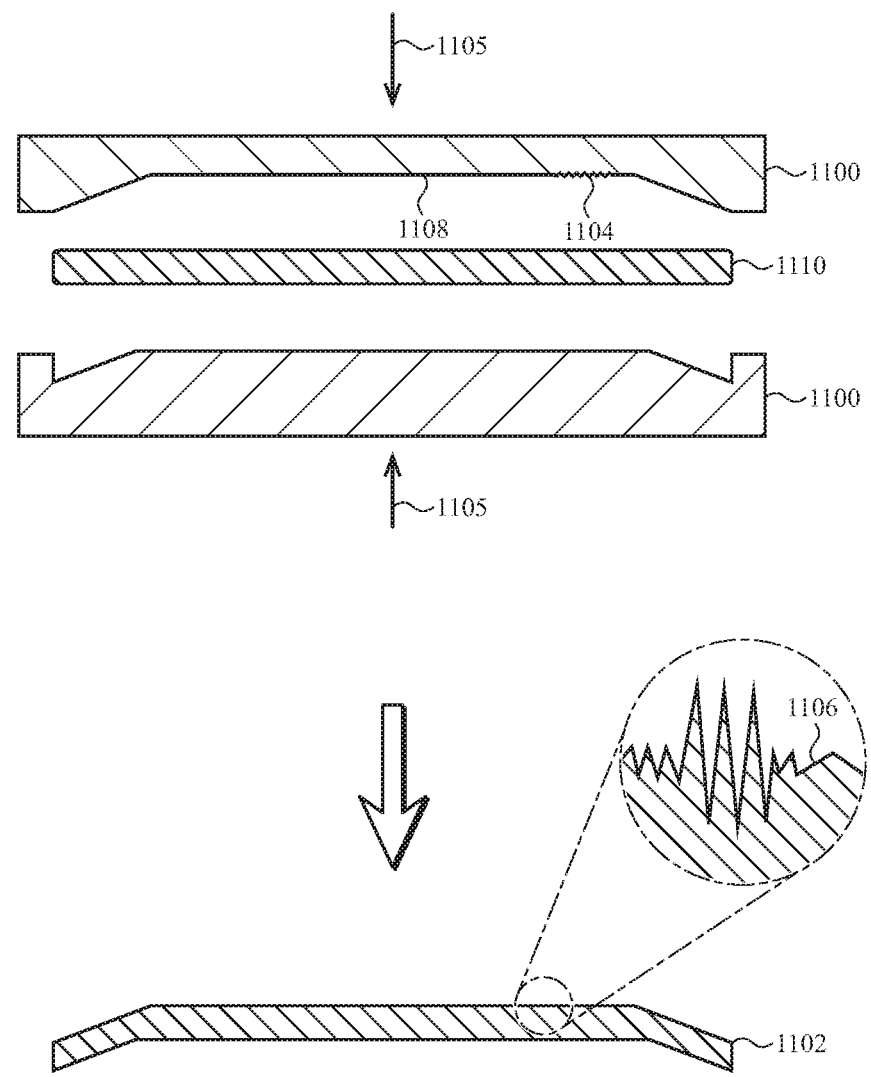
FIG. 11 shows a schematic of thermoforming a glass sheet into a contoured glass sheet have one or more zones of textured surface.

As shown in FIG. 11, a mold 1100 having a negative imprint or pattern of a desired texture is used to thermoform a desired glass article 1102 (part of a thermoform molding machine). The mold exhibits the corresponding negative texture pattern 1104 as required in the glass article 1106, as shown in the corresponding exploded view. As above, the mold surface or face 1108, having the negative imprint 1104 is heated to above the glass transition temperature and pressure applied (arrow 1105) to imprint the textured pattern on the softened glass. As noted in previous embodiments, the mold does not have to be heated, where the glass sheet 1110 is first heated to above the glass transition temperature, and then placed in the mold 1100. The mold may have portions that include the textured pattern and portions that remain smooth. As would be expected, textured and smooth portions of the mold may be adjacent to one another. In addition, various different textured patterns may form portions adjacent one another. As illustrated in FIG. 11, zones or portions of the glass surface have the imprinted texture 1106, and are cooled to form the desired glass article having the desired glass article contoured shape. The resultant glass article 1102 can have localized or global texture added to the glass surface useful for an improved tactile feel, or enhanced capability for the function of the glass surface, bonding other materials due to its enhanced surface area, for example (e.g., Datum bonding to a frame/anti-splinter film), i.e., function.

Texture addition to a glass article herein can also allow for a glass surface having a controlled texture gradient, useful in functional attributes like Haze Control for various sensors or displays. Texture can be added in zones or portions of the glass and can be accomplished by gradients or steps. The addition of texture to a glass article during the thermoforming process is a significant advantage over chemical etching of texture into an already formed glass article, both in complexity and precision. The textured surface added by the thermoforming process is substantially free of the damage caused by chemical etching, for example, scratching or etching damage. Any useful texture can be added to a glass article herein as long as the negative imprint can be accommodated on the thermoforming mold surfaces. In typical embodiments, the glass article can exhibit an average surface roughness of from 0.5 to 10 µm and more typically 0.5 µm to 7 µm.

Figure 12:
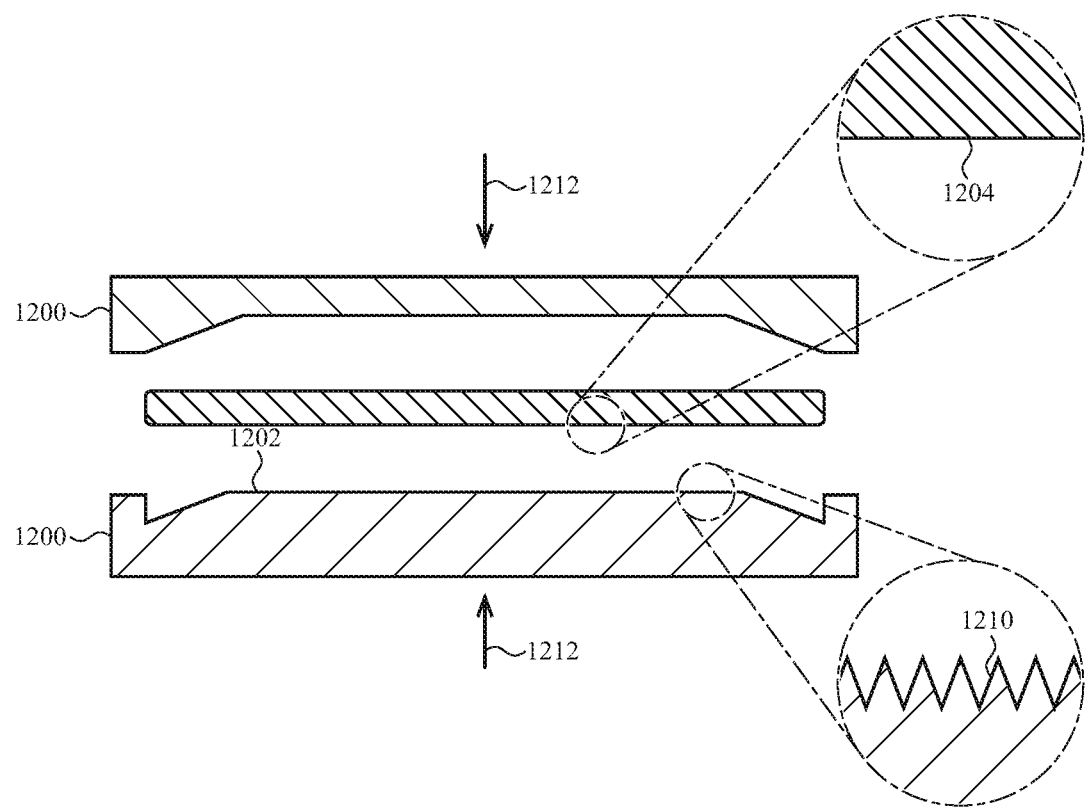
FIG. 12 shows a schematic for thermoforming a glass sheet into a contoured glass sheet having one or more zones of superhydrophobicity.
Figure 13:
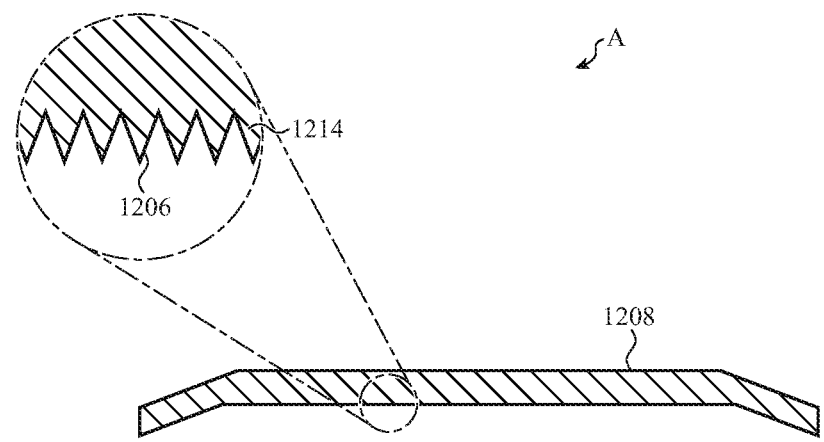
FIG. 13 shows an illustrative view of a glass surface face having a superhydrophobic imprint.

FIG. 12 and FIG. 13 show an illustrate mold 1200 (part of a thermoform molding machine) for use in accordance with embodiments herein. A mold face 1202 is prepared, i.e, media blasted, machined, etched, to include a desired negative imprint for inclusion on the glass article surface 1204. It can be envisioned that inclusion of a texture to a glass article during the thermoforming process is a significant improvement over etching or machining each completed glass article after formation, this is particularly true where significant numbers of textured articles are needed. The textured surface is substantially free of damage caused by chemical etching, particularly scratching or etching damage.

FIG. 13 shows addition of a superhydrophobic surface 1206 to a glass article 1208 using the thermoforming processes in accordance with embodiments herein. Here a negative hydrophobic pattern 1210 is formed on the mold 1200 used in the thermoforming process discussed above. FIG. 12 and FIG. 13 show the hydrophobic pattern 1210 can be applied to all or a portion of the mold surface by laser ablation. The process for laser ablation on a mold surface is achievable due to the metal's high material opacity. However, this same laser ablation procedure has shown little positive effect when performed on glass (glass has a high transparency). As such, transfer of the superhydrophobic surface from the metal mold surface 1202 to the glass article surface 1208 during thermoforming (shown as arrow 1212) provides a significant achievement in glass surface utility. The imprint pattern required for a superhydrophobic surface is on the nanoscale.

Again referring to FIG. 13, the superhydrophobic surface can include an array of protrusions having a diameter of less than 50 nm. In some cases, the protrusions have a diameter of less than 30 nm. A glass surface that exhibits a superhydrophobic surface is able to resist water, debris, and fingerprinting. The capacity to form a hydrophobic surface in the absence of laser ablation to the glass surface is a significant advancement in the glass forming art. As for previous embodiments, the superhydrophobic surface can be included globally on the glass article, or can be included only on select zones, dependent on the targeted use.

Embodiments herein also include thermoforming two or more dissimilar materials together so as to join them and form one unitary material with different bulk material properties. As above, the joining occurs while the unitary material is being thermoformed into a contoured desired shape. Dissimilar materials herein can be glass articles having different material properties, i.e, coefficient of thermal expansion, hardness, strength, Young's Modulus, and the like, or can be two different materials all together, for example, joining a glass sheet with a ceramic sheet. The materials can be the same shape, size and thickness or can be of different shapes, sizes and thicknesses. Typically, the dissimilar materials have a joining surface that is flat and smooth and allows for the thermoforming process to integrate the contacting surfaces into one co-material, but where the surfaces do not form sufficient contact, a cladding layer may be sandwiched between the dissimilar materials to allow for formation of a unitarily joined, and contoured end material.

Figure 14:
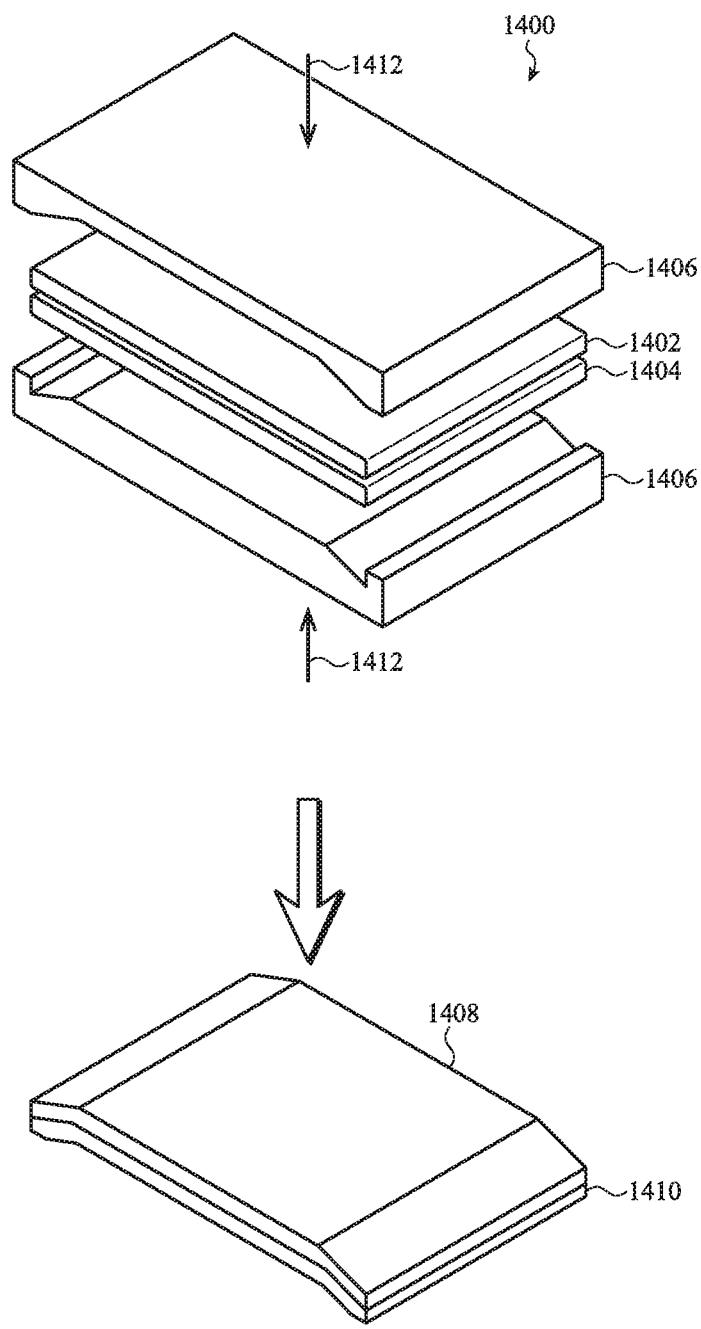
FIG. 14 shows a schematic of thermoforming two dissimilar materials into a bonded contoured sheet in accordance with an embodiment herein.

FIG. 14 illustrates a simplified schematic of thermoforming two dissimilar materials into a single part having a desired contoured shape in accordance with embodiments herein 1400. Although this embodiment can be applied to numerous types of materials, it will be discussed in relation to glass sheets having dissimilar material properties or to a glass sheet and ceramic combination. Also, it can be envisioned that more than two dissimilar materials can be thermoformed into a single part having a desired shape, however, the description will be limited to two with the understanding that additional materials can be added to the thermoforming process, for example, 3, 4, 5 and the like, to form a single part.

Referring to FIG. 14 again, the two dissimilar materials, top 1402 and bottom 1404, are layered on each other and positioned in a mold (part of a thermoform molding machine) 1406 to be contoured under heat and pressure. The two materials, 1402 and 1404, must be heated to above each materials glass transition temperature, but not above either materials melting temperature. As above, the heating of the materials can be performed in a vacuum. Heating the two materials, for example two different glass sheets, above each materials glass transition temperature will result in the two materials being joined or bonded into one single sheet or part 1408 along the contact surface 1410. As noted above, the contact surface of each glass sheet must be smooth. This same state of the two materials also allows for the joined sheet to be receptive to pressure (arrow 1412) that allows for contour modifications.

Figure 15:
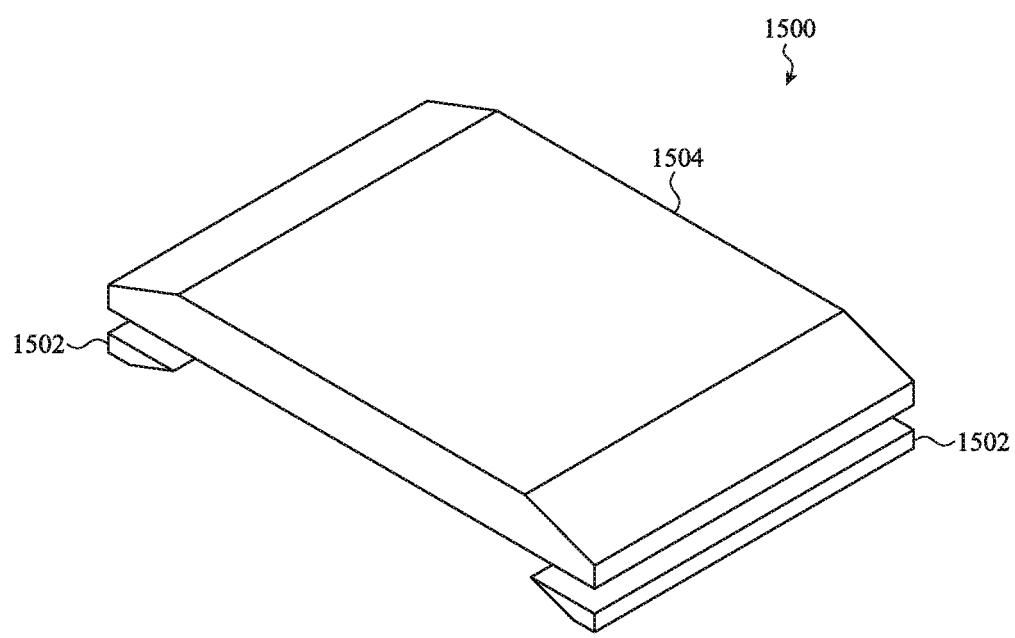
FIG. 15 shows a schematic of thermoforming two dissimilar materials into a bonded contoured sheet in accordance with an alternative embodiment herein.

FIG. 15 illustrates joining two dissimilar materials that have different material properties and sizes/thicknesses 1500. Here, the second material 1502 is joined to only a portion or zone of the first material 1504, in order to provide a particular outer geometer, for example. It can be imagined that joining multiple layers of material, having differing material properties, shapes and thicknesses, provides a significant advantage over conventional machining or post production processes. In this embodiment, a matrix of different opportunities can be utilized to form an appropriate final part having the correct shape, material property and thickness.

Figure 16:
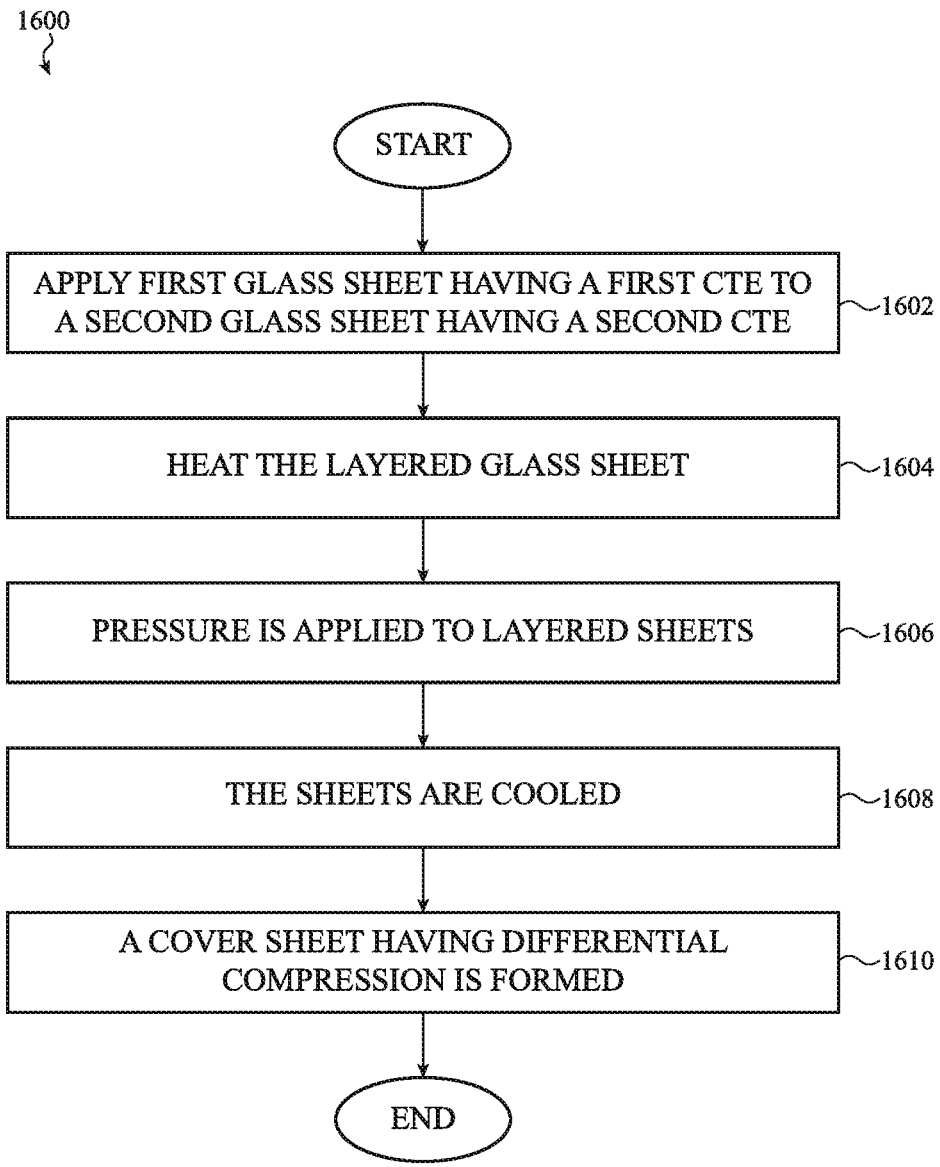
FIG. 16 shows a flow diagram for preparing a thermoformed glass article having two separate glass sheets bonded together, each glass sheet having a different coefficient of thermal expansion (CTE)

FIG. 16 is a flow diagram illustrating a process for bonding two glass sheets together to form a cover sheet having a top surface under compression as compared to a bottom surface 1600. In this embodiment, and in operation 1602, the two glass sheets having differing coefficients of thermal expansion (CTE) are joined. In operation 1604, the two sheets are heated under pressure and contract differently due to their differences in CTE, while the unitary part is thermoformed to a specified contour shape. In operation 1602, a first glass sheet having a low CTE is layered on top of a second glass sheet having a high CTE (CTE is relative to each other). The joining surface is smooth. In operation 1604, the two glass sheets are heated to above the glass transition temperature for each sheet. In operation 1606, pressure is exerted by the mold faces to join the two glass sheets together and form a desired shape of the now joined cover sheet. The exerted pressure and heat must also be sufficient to allow for atomic bonding between the two contacting glass sheets. In operation 1608, the cover sheet is cooled, where the second glass sheet, having the higher CTE, contracts to a greater degree than the material of the first glass sheet (lower CTE). In operation 1610, because the two materials are joined together via the thermoforming process, the interface prevents the second glass sheet material from fully contracting, but results in the first glass sheet material, i.e., the outer surface of the cover sheet to be under compression. The outer surface of the cover sheet will have asymmetric surface compression that acts to protect the surface from damage introduction. The inner material of the cover sheet is away from the environment and at lower risk of damage.

Figure 17:
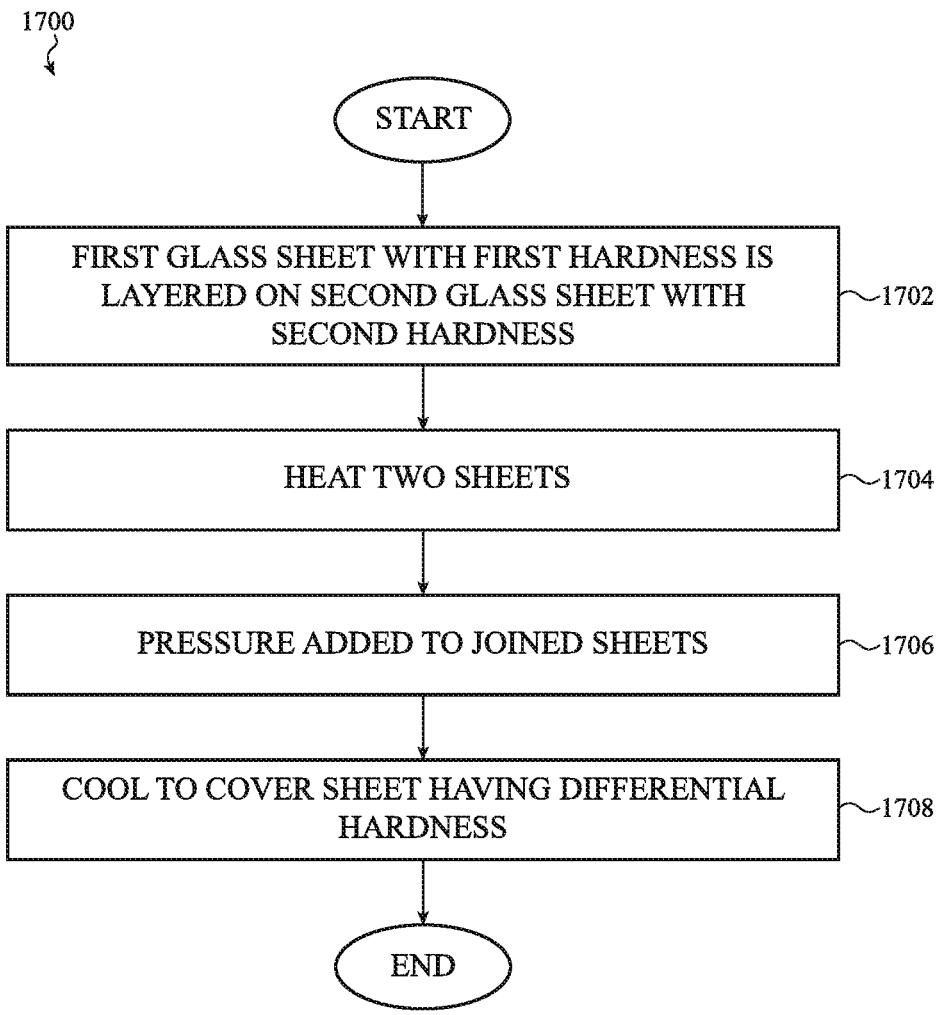
FIG. 17 shows a flow diagram for preparing a thermoformed glass article having two separate glass sheets bonded together, each glass sheet having a different hardness.

FIG. 17 is a flow diagram illustrating a process for bonding two glass sheets together to form a cover sheet having a top and bottom surface with differing harnesses 1700. In this embodiment, the two glass sheets having different hardnesses are joined through thermoforming to form a cover sheet with a desired contour shape. In operation 1702, the first glass sheet having a high material hardness is layered on top of a second glass sheet having a lower material hardness. As in previous embodiments, the joining surface must be smooth. In operation 1704, the two glass sheets are heated to above the glass transition temperature for each sheet. In operation 1706, pressure is exerted by the mold faces to join the two glass sheets together and form a desired shape of the now unitary cover sheet. As above, the pressure and heat must be sufficient to allow for atomic bonding between the two hardness materials. In operation 1708, the cover sheet is cooled forming a unitary material where the top surface (corresponding to glass sheet one) is able to resist damage to a greater extent than the bottom surface (corresponding to glass sheet two). The hardness of glass sheet one is consistent with the needs of an exterior surface of an electronic device. The second sheet can be optimized for price and processing since it is located on the interior side of the electronic device. In this embodiment, the thickness of each sheet can also be optimized to allow for damage protection on the upper surface of the cover sheet, for example, the first sheet could be 0.5 mm, while the second sheet could be 2 mm thick.

Figure 18:
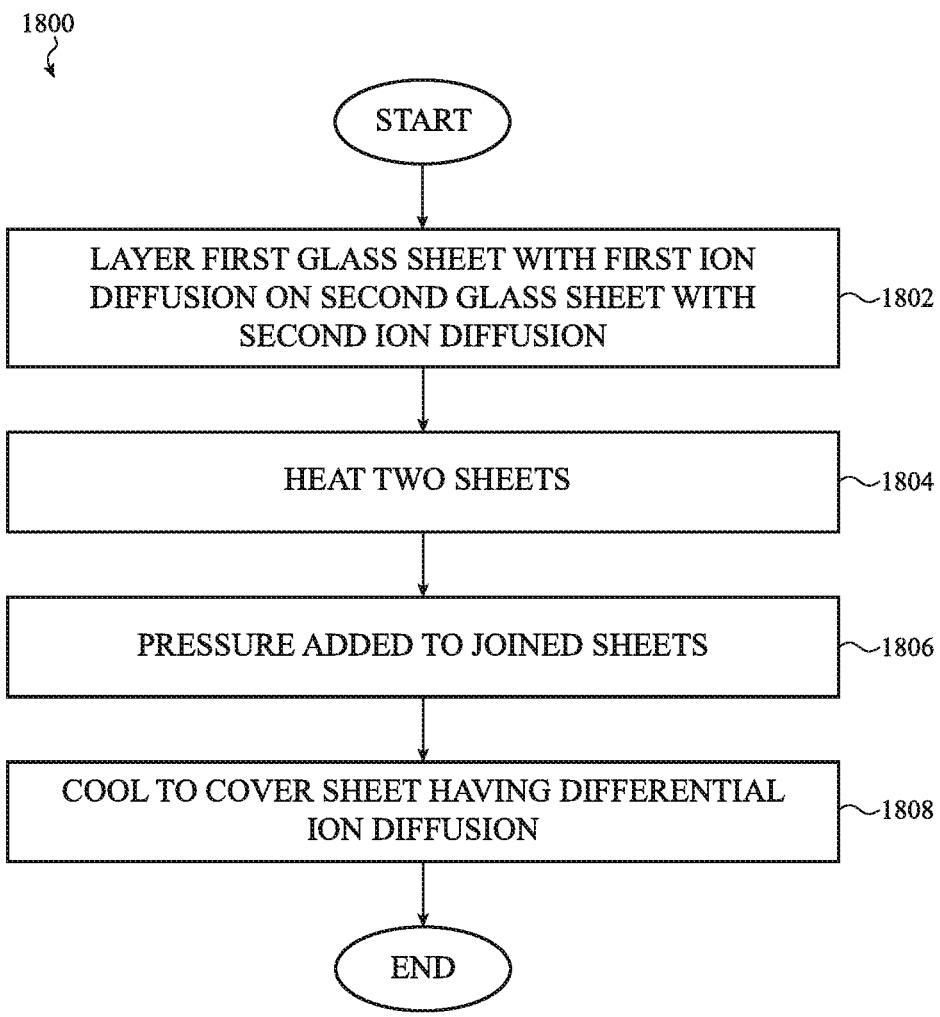
FIG. 18 shows a flow diagram for preparing a thermoformed glass article having two separate glass sheets bonded together, each sheet having a different capacity for ion diffusion.

FIG. 18 is a flow diagram illustrating a process for bonding two glass sheets together to form a cover sheet having a top and bottom surface with differing capacity for ion diffusion 1800. Ion diffusion can be controlled by a number of parameters which are all envisioned to be within the scope of the present disclosure. For example, the composition and ion placement in the glass, density of the glass, ion limiting coatings on the glass, and the like. In this embodiment, the two glass sheets having different ion diffusion capacity are joined together via thermoforming to form a cover sheet with a desired contour shape. In operation 1802, the first glass sheet, having rapid ion diffusion, is layered on top of a second glass sheet, having lower ion diffusion (relative to each other). As in previous embodiments, the joining surface must be smooth. In operation 1804, the two glass sheets are heated to above the glass transition temperature for each sheet. In operation 1806, pressure is exerted by the mold faces to join the two glass sheets together, and form a desired shape of the now unitary cover sheet. As above, the pressure and heat must be sufficient to allow for atomic bonding between the two hardness materials. In operation 1808, the cover sheet is cooled forming a unitary material where the top surface (corresponding to glass sheet one) has a greater capacity to be chemically strengthened than the bottom surface (corresponding to glass sheet two).

Cover sheets formed as described in FIG. 18 can be further processed by alkali metal solution bath treatments. For example, upon cooling, the cover sheet, having dissimilar ion diffusion surfaces, would be subjected to a sodium bath to allow for asymmetric diffusion of sodium ions into the top surface of the cover sheet, as compared to the lower cover sheet surface. Further, potassium ion bath treatment may also be utilized to add compression to the top surface and further strengthen the top or outer surface of the cover sheet as compared to the bottom or inner surface. Asymmetric strengthening is particularly advantageous for cover sheets, where a compression budget exists across a thickness of all glass, but can be maximized to the outer surface—essentially taking some of the compression from the bottom and moving it to the top to keep the budget equal (as compared to symmetrical strengthening, where the two sides must be equally compressed, using the same or equal compression budget, the case where both glass sheets have the same capacity for ion diffusion). As discussed above, any number of chemical strengthening steps can be taken that take advantage of the differential ion diffusion capacity of the jointed glass materials.

Figure 19:
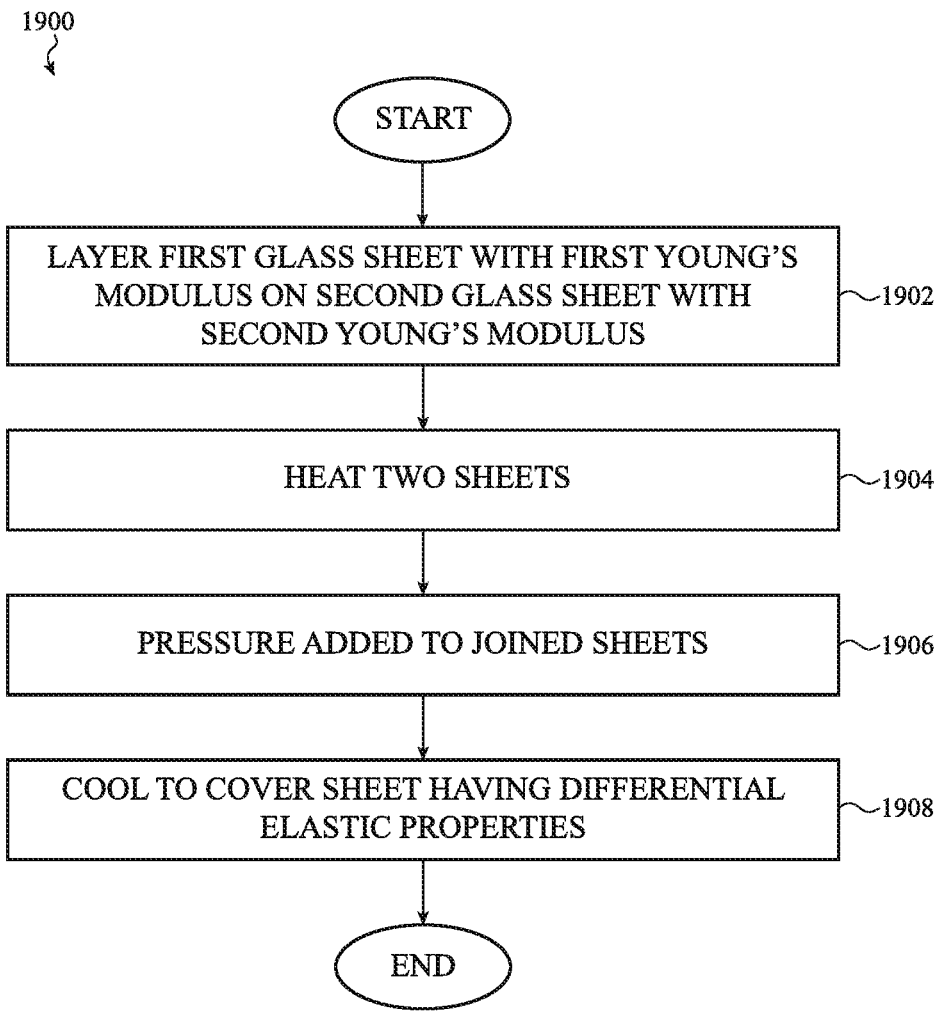
FIG. 19 shows a flow diagram for preparing a thermoformed glass article having two separate glass sheets bonded together, each sheet having a different Young's modulus.

FIG. 19 is a flow diagram illustrating a process for bonding two glass sheets together to form a cover sheet having a top and bottom surface with differing Young's Modulus (elastic modulus) 1900. In this embodiment, the two glass sheets having different elastic deformation properties are joined together via thermoforming to form a cover sheet with a desired contour shape. In operation 1902, the first glass sheet, having a high Young's Modulus, is layered on top of a second glass sheet, having a lower Young's Modulus (relative to each other). As in previous embodiments, the joining surface must be smooth. In operation 1904, the two glass sheets are heated to above the glass transition temperature for each sheet. In operation 1906, pressure is exerted by the mold faces to join the two glass sheets together and form a desired shape of the now unitary cover sheet. As above, the pressure and heat must be sufficient to allow for atomic bonding between the two glass sheets. In operation 1908, the cover sheet is cooled forming a unitary material where the top surface (glass sheet one) resists damage introduction due to its higher elastic deformation properties, whereas the inner or lower surface (glass sheet two) is able to deflect or flex to a relatively greater extent. The lower glass sheet will be positioned on the inside of the enclosure (see FIG. 3), where its lower Young's Modulus will allow it to internally bend during failures commonly seen during drop events.

Figure 20:
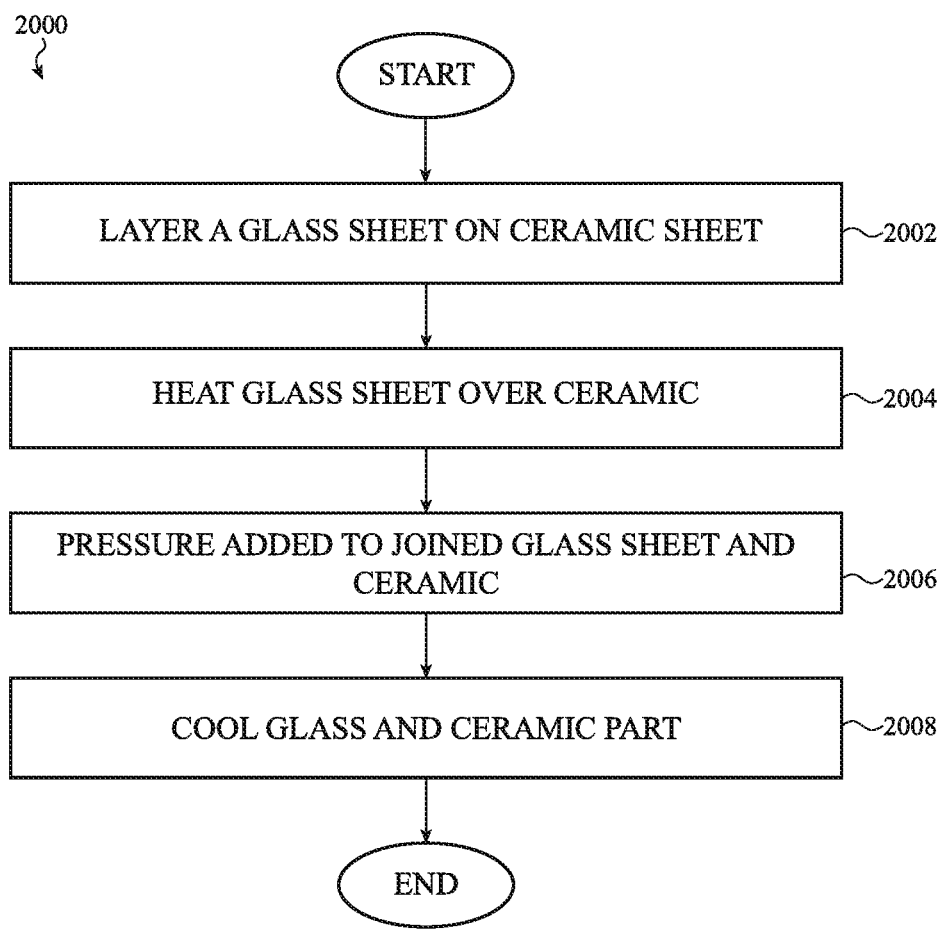
FIG. 20 shows a flow diagram for preparing a thermoformed material having one glass sheet and one ceramic sheet bonded together.

FIG. 20 is a flow diagram illustrating a process for bonding a glass sheet to a ceramic sheet 2000. In this embodiment, the ceramic sheet or portion acts as a foundation for the surface glass sheet. Referring to FIG. 15, briefly, the ceramic material can be a ceramic ring with an appropriate geometry preloaded into a mold. Here the ceramic is acting as a "ceramic foot" on which the glass sheet will be overlaid.

In FIG. 20, and in operation 2002, the first glass sheet, having an appropriate hardness and strength to act as the outer surface of a cover sheet, is layered on top of the underlying ceramic footer. As in previous embodiments, the joining surface must be smooth. In operation 2004, the glass sheet and ceramic footer are heated to a temperature that allows thermoforming of the glass to the pre-formed ceramic. In operation 2006, pressure is added to contour the glass sheet to a desired shape (again refer to FIG. 15) on the ceramic. In operation 2008, the glass and ceramic cover sheet is cooled, forming a curved glass surface that can be integrated directly into a housing body.

Embodiments related to joining two or more dissimilar materials using the thermoforming processes herein, may include a sandwiched cladding layer. Where the two dissimilar materials, for example, a ceramic and glass sheet, do not form a smooth contact surface, an incomplete bond will form. Incomplete bonds between otherwise thermoformed materials results in an unacceptable air gap. To overcome this obstacle and allow thermoforming, a cladding layer can be sandwiched between the two dissimilar materials.

Figure 21A:
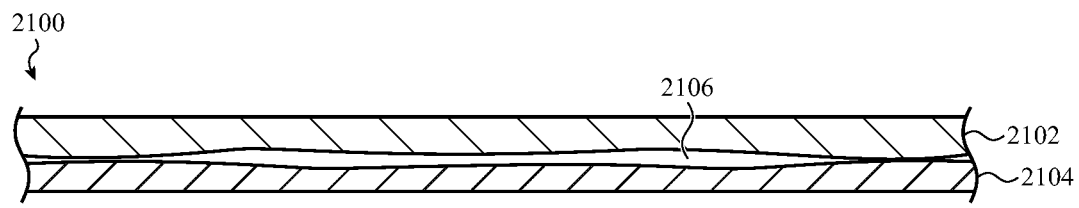
FIG. 21A shows a schematic of two glass sheets with uneven surfaces in need of joining.

FIG. 21A shows a cross-section of two glass sheets that do not form a smooth joining surface 2100. A top sheet 2102 and a bottom or base sheet 2104 are layered together, but air gaps exist between the surfaces of each respective sheet 2106. Where the two sheets undergo thermoforming, with an imperfect joining, the air gaps that forms in the cover sheet minimizes the utility of the cover sheet.

Figure 21B:
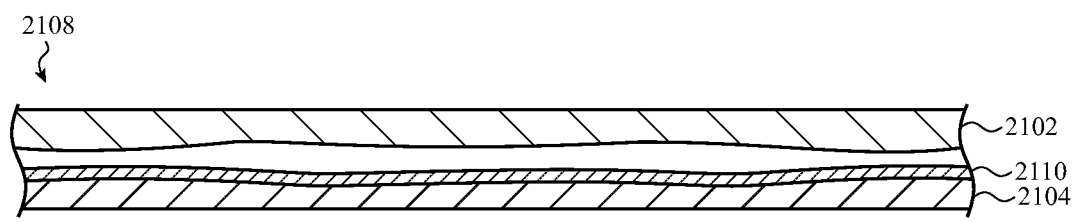
Figure 21C:
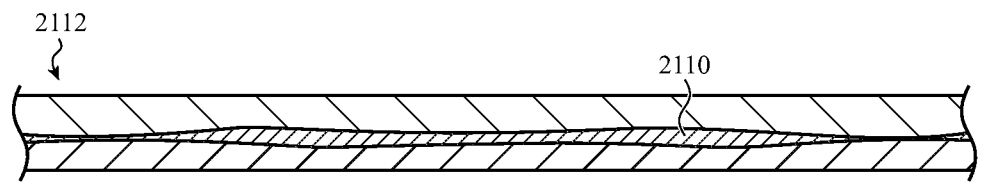
FIG. 21C shows a schematic of thermoforming two dissimilar materials with a sandwiched cladding layer into a bonded contoured sheet in accordance with an embodiment herein.

FIG. 21B shows a cross-sectional schematic of two glass sheets with a sandwiched cladding layer 2108 positioned therebetween. A cladding layer 2110 is positioned between the two glass sheets, 2102 and 2104, such that the cladding layer 2110 acts to fill in the surface gaps between the two glass sheets. The cladding layer eliminates air gaps and enhances the bonding formed between the two glass sheets during the thermoforming process 2112, as show in FIG. 21C. In FIG. 21C, a cladding layer 2110 is selected to have enhanced plastic flow at the thermoforming temperature, necessary for the top 2102 and bottom (base) 2104 glass sheets. The cladding layer 2110 need not provide any additional mechanical properties but rather will remain at the neutral axis of the formed cover sheet. It is also envisioned that multiple cladding layers can be positioned between the two glass sheets, each cladding layer having a different refractive index. For example, a first cladding layer and second cladding layer can be positioned such that the cumulative refractive index for the two layers is 0. In this embodiment, one or more, two or more, three or more, and the like, cladding layers can be combined to obtain a combined cladding layer with an appropriate index of refraction.

In some embodiments, the cladding material is an oxide, like calcium oxide. In other embodiments, the cladding material is a transparent or colored polymer (depending on the use). Typically, cladding layers are added between a glass sheet and ceramic material, or when one or both of the two glass sheets has a surface roughness that prevents atomic bonding during the thermoforming process.

In accordance with embodiments herein, cladding layers can be joined to the exterior surface(s) of cover sheets herein as well. A cladding layer can be coated to the exterior surface(s) of a glass sheet during the thermoforming processes described herein. The cladding layer can also be added to the exterior surface of either the first glass sheet or second glass sheet during the joining of two materials discussed herein. In this embodiment, the cladding layer is deposited on the exterior surface of a glass sheet so as to fill in any defects or gaps in the glass sheet. The cladding layer can be used in conjunction with a cladding layer positioned between two glass sheets to remove gaps, or can be used on two glass sheets or a glass and ceramic sheet joined together in the absence of a cladding layer. The cladding layer typically is formed from a glass material that has a melting point lower than the melting point of the exterior surface of the glass sheet.

As can be imagined, embodiments herein can be combined to form desired cover sheets for a handheld electronic device. For example, cover sheets formed from two dissimilar glass sheets can have one of the glass sheet surfaces modified with a property-enhancing material during the thermoforming process, the same process that joins the two sheets and contours the cover sheet. So for example, a cover sheet formed from two materials having dissimilar CTE, could further include a hard ceramic powder embedded in the upper sheet having the lower CTE. A cover sheet formed from two materials having dissimilar elastic properties, could further include a localized strengthening in the surface of the glass sheet having a higher Young's Modulus. Cladding layers may be required, either internally between two dissimilar glass sheets or exterior, to fill in defects on any surface of a glass sheet. Any useful combination can be utilized to maximize the glass article's utility. Also, all embodiments described herein may be further treated via chemical strengthening baths, annealing or other glass modifying techniques. The many options created in the embodiments herein provide for design and formation of a significant number of useful glass articles, particularly in the electronics industry, where the cover sheets require well suited properties for a particular use.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for forming a cover sheet for an electronic device, comprising:
    positioning a first glass sheet having a first Young's modulus with respect to a second glass sheet having a second Young's modulus less than the first Young's modulus;
    applying heat to the first glass sheet and to the second glass sheet;
    using a mold to apply pressure to a surface of the first glass sheet and to a surface of the second glass sheet to:
        form a unitary sheet by bonding the first glass sheet to the second glass sheet, the bonding including chemically bonding the first glass sheet to the second glass sheet; and
        conform the unitary sheet to a contoured shape to form a contoured cover sheet, the first glass sheet defining an exterior surface and the second glass sheet defining an interior surface of the contoured cover sheet;
    cooling the contoured cover sheet, the operation of cooling the contoured cover sheet comprising:
        cooling a first surface region of the contoured cover sheet by cooling a first zone of the mold at a first rate, thereby producing a first density within the first surface region of the contoured cover sheet; and
        cooling a second surface region of the contoured cover sheet by cooling a second zone of the mold at a second rate, less than the first rate, thereby producing a second density, greater than the first density, within the second surface region of the contoured cover sheet, the second surface region positioned along a same surface as the first surface region and the same surface is the exterior surface or the interior surface of the contoured cover sheet; and
    chemically strengthening the contoured cover sheet to form a first compressive stress layer along the exterior surface and a second compressive stress layer along the interior surface.

2. The method of claim 1, wherein the contoured shape defines curved portions along a periphery of the contoured cover sheet.

3. The method of claim 1, wherein the first glass sheet is thinner than the second glass sheet.

4. The method of claim 1, wherein:
    the first glass sheet has a first coefficient of thermal expansion;
    the second glass sheet has a second coefficient of thermal expansion that is greater than the first coefficient of thermal expansion; and
    a portion of the second glass sheet in the contoured cover sheet is placed into tension.

5. The method of claim 1, wherein:
    the first glass sheet has a first ion exchange rate property;
    the second glass sheet has a second ion exchange rate property that is different than the first ion exchange rate property; and
    the first compressive stress layer differs from the second compressive stress layer.

6. The method of claim 1, wherein each of the first surface region and the second surface region is positioned along the exterior surface of the contoured cover sheet.

7. The method of claim 6, wherein:
    a third surface region along the interior surface of the contoured cover sheet and opposite the first surface region has a density that is substantially the same as a density of a fourth surface region along the interior surface and opposite the second surface region.

8. The method of claim 1, wherein the contoured cover sheet is a glass sheet.

9. The method of claim 1, wherein each of the first surface region and the second surface region is positioned along the interior surface of the contoured cover sheet.

10. A method for forming a cover sheet for an electronic device comprising:
    positioning a layer of a first glass material in a mold, the first glass material having a first Young's modulus;
    positioning a layer of a second glass material adjacent to the layer of the first glass material; the second glass material having a second Young's modulus less than the first Young's modulus;
    heating the layer of the first glass material and the layer of the second glass material;
    applying, with the mold, pressure to the layer of the first glass material and the layer of the second glass material to chemically bond the layer of the first glass material to the layer of the second glass material and form a unitary cover sheet having a contoured shape, the applying the pressure occurring while:
        the layer of the first glass material is at a first temperature greater than a glass transition temperature and less than a melting point of the first glass material; and
        the layer of the second glass material is at a second temperature greater than a glass transition temperature and less than a melting point of the second glass material;
    cooling the unitary cover sheet to a third temperature below the glass transition temperature of each of the first glass material and the second glass material, the operation of cooling the unitary cover sheet comprising:
        cooling a first region of an interior surface of the unitary cover sheet by cooling a first zone of the mold at a first rate, thereby producing a first density within the first region of the interior surface, the interior surface defined by the layer of the second glass material; and
        cooling a second region of the interior surface of the unitary cover sheet by cooling a second zone of the mold at a second rate, less than the first rate, thereby producing a second density, greater than the first density, within the second region of the interior surface; and
    chemically strengthening the unitary cover sheet to form:
        a first compressive stress layer along an exterior surface of the unitary cover sheet defined by the layer of the first glass material; and
        a second compressive stress layer along the interior surface of the unitary cover sheet.

11. The method of claim 10, wherein:
    the unitary cover sheet has a thickness less than 3 mm.

12. The method of claim 10, wherein the operation of chemically strengthening the unitary cover sheet comprises exchanging ions in the first glass material and the second glass material with potassium ions.

13. The method of claim 10, wherein the contoured shape of the cover sheet includes a curved portion along a periphery of the cover sheet.

14. The method of claim 13, wherein the curved portion defines a curved exterior surface and a curved interior surface of the cover sheet.

15. A method for forming a cover sheet for an electronic device, comprising:
positioning a first glass sheet having a first Young's modulus with respect to a second glass sheet having a second Young's modulus less than the first Young's modulus;
applying heat to the first glass sheet and to the second glass sheet;
using a mold to apply pressure to a surface of the first glass sheet and to a surface of the second glass sheet to:
form a unitary sheet by bonding the first glass sheet to the second glass sheet, the bonding including chemically bonding the first glass sheet to the second glass sheet; and
conform the unitary sheet to a contoured shape to form a contoured cover sheet, the first glass sheet defining an outer surface and the second glass sheet defining an inner surface of the contoured cover sheet;
cooling the contoured cover sheet, the operation of cooling the contoured cover sheet comprising:
cooling a first region of the outer surface of the contoured cover sheet by cooling a first zone of the mold at a first rate, thereby producing a first density within the first region of the outer surface; and
cooling a second region of the outer surface of the contoured cover sheet by cooling a second zone of the mold at a second rate, less than the first rate, thereby producing a second density, greater than the first density, at the second region of the outer surface; and
chemically strengthening the contoured cover sheet to form a first compressive stress layer along the outer surface and a second compressive stress layer along the inner surface.

16. The method of claim 15, wherein the first region of the outer surface has a first hardness that is less than a second hardness of the second region.

17. The method of claim 15, wherein a first portion of the first compressive stress layer extending from the first region of the outer surface has a depth that is greater than a depth of a second portion of the second compressive stress layer extending from the second region.

18. The method of claim 15, wherein the first glass sheet defines:
a front surface and a side surface of an enclosure of the electronic device; and
a curved surface extending between the front surface and the side surface.

19. The method of claim 15, wherein the contoured cover sheet defines:
a flat central portion; and
a peripheral region that is obliquely angled with respect to the flat central portion.

20. The method of claim 15, wherein the first glass sheet is formed from an aluminosilicate glass.

* * * * *